(12) United States Patent
Seguchi et al.

(10) Patent No.: US 10,756,661 B2
(45) Date of Patent: Aug. 25, 2020

(54) FIELD WINDING TYPE ROTATING ELECTRIC MACHINE

(71) Applicant: DENSO CORPORATION, Kariya, Aichi-pref. (JP)

(72) Inventors: Masahiro Seguchi, Kariya (JP); Junichi Nakazono, Kariya (JP)

(73) Assignee: DENSO CORPORATION, Kariya (JP)

(*) Notice: Subject to any disclaimer, the term of this patent is extended or adjusted under 35 U.S.C. 154(b) by 0 days.

(21) Appl. No.: 16/440,263

(22) Filed: Jun. 13, 2019

(65) Prior Publication Data

US 2019/0296672 A1    Sep. 26, 2019

Related U.S. Application Data

(63) Continuation of application No. PCT/JP2017/044224, filed on Dec. 8, 2017.

(30) Foreign Application Priority Data

Dec. 13, 2016  (JP) ................. 2016-241523

(51) Int. Cl.
   *H02P 23/26*  (2016.01)
   *H02P 6/32*   (2016.01)
   *H02P 27/08*  (2006.01)
   *H02K 1/24*   (2006.01)

(52) U.S. Cl.
   CPC ............. *H02P 23/26* (2016.02); *H02P 6/32* (2016.02); *H02P 27/08* (2013.01); *H02K 1/243* (2013.01); *H02P 2207/05* (2013.01)

(58) Field of Classification Search
   CPC ................. H02P 23/26; H02K 1/243
   See application file for complete search history.

(56) References Cited

U.S. PATENT DOCUMENTS 6,188,204 B1 * 2/2001 Vithayathil ............ H02K 17/42
                                                              310/159
9,221,458 B1 * 12/2015 Tamai .................... B60W 20/40
9,800,183 B1 * 10/2017 Wang .................. H02P 21/0089
(Continued)

FOREIGN PATENT DOCUMENTS

| JP | 2008-178211 A | 7/2008 |
| JP | 2010-110079 A | 5/2010 |
| JP | 5403338 B2    | 1/2014 |

*Primary Examiner* — Bentsu Ro
(74) *Attorney, Agent, or Firm* — Oliff PLC

(57) ABSTRACT

A field winding type rotating electric machine, whose power factor is cos θ, includes a stator, a rotor with a field winding, a rectifying element, a drive unit and a control unit. When performing rectangular-wave or overmodulation energization, the control unit generates a voltage pulse pair, which induces a current pulse pair, by: setting a reference time to the center of an ON duration or OFF duration of a control signal of a first phase; and providing a temporary ON duration and a temporary OFF duration after a predetermined angle from the reference time. The predetermined angle is within a predetermined range including $\cos^{-1} \theta$ in electrical angle. The temporary ON duration is provided to temporarily turn ON a control signal of a second phase during an OFF duration thereof. The temporary OFF duration is provided to temporarily turn OFF a control signal of a third phase during an ON duration thereof.

8 Claims, 14 Drawing Sheets

(56) References Cited

U.S. PATENT DOCUMENTS

2014/0042938 A1* 2/2014 Shoji ................... H02P 21/0089
                                                          318/400.02
2018/0191288 A1* 7/2018 Li ......................... H02P 27/045
2019/0097562 A1* 3/2019 Lee ....................... H02P 27/085

* cited by examiner

FIELD WINDING TYPE ROTATING ELECTRIC MACHINE

CROSS-REFERENCE TO RELATED APPLICATIONS

The present application is a continuation application of International Application No. PCT/JP2017/044224 filed on Dec. 8, 2017, which is based on and claims priority from Japanese Patent Application No. 2016-241523 filed on Dec. 13, 2016. The contents of these applications are hereby incorporated by reference in their entirety into the present application.

BACKGROUND

1 Technical Field

The present disclosure relates to field winding type rotating electric machines that include a stator, a rotor, a rectifying element, a drive unit and a control unit.

2 Description of Related Art

Conventionally, there has been disclosed a technique relating to a synchronous machine that is designed to perform control so as to make an average voltage of each phase voltage equal to zero, thereby stabilizing each phase current and stably performing excitation of a rotor. Specifically, when the energization mode is rectangular-wave energization or overmodulation energization, a control unit of the synchronous machine outputs, in the case of superimposing pulse voltages for exciting the rotor on fundamental voltages, control signals so as to make the average value of each phase voltage equal to zero.

SUMMARY

According to the present disclosure, a field winding type rotating electric machine includes: a stator having stator windings of three or more phases wound therein; a rotor including a rotor core with a field winding wound thereon, the rotor being rotatably arranged to face the stator; a rectifying element connected in series with the field winding to restrict field current flowing in the field winding to one direction, the field current being generated by exciting the field winding with magnetic fields that are created by supplying stator currents to flow in the stator windings; a driver including a plurality of switching elements and configured to output electric power of a plurality of phases to the stator windings; and a controller configured to output, to the driver, control signals of the plurality of phases for performing any of sine-wave energization, rectangular-wave energization and overmodulation energization according to rotational speed of the rotor. A power factor of the field winding type rotating electric machine is cos θ. The controller is configured to generate, when performing the rectangular-wave energization or the overmodulation energization, a voltage pulse pair, which induces a current pulse pair, by: setting a reference time to a center of an ON duration or an OFF duration of the control signal of a first phase of the plurality of phases; and providing a temporary ON duration and a temporary OFF duration after a predetermined angle from the reference time. The predetermined angle is within a predetermined range including $\cos^{-1} \theta$ in electrical angle. The temporary ON duration is provided to temporarily turn ON the control signal of a second phase of the plurality of phases, which is different from the first phase, during an OFF duration of the control signal of the second phase. The temporary OFF duration is provided to temporarily turn OFF the control signal of a third phase of the plurality of phases, which is different from both the first and second phases, during an ON duration of the control signal of the third phase.

DESCRIPTION OF EMBODIMENTS

Figure 1:
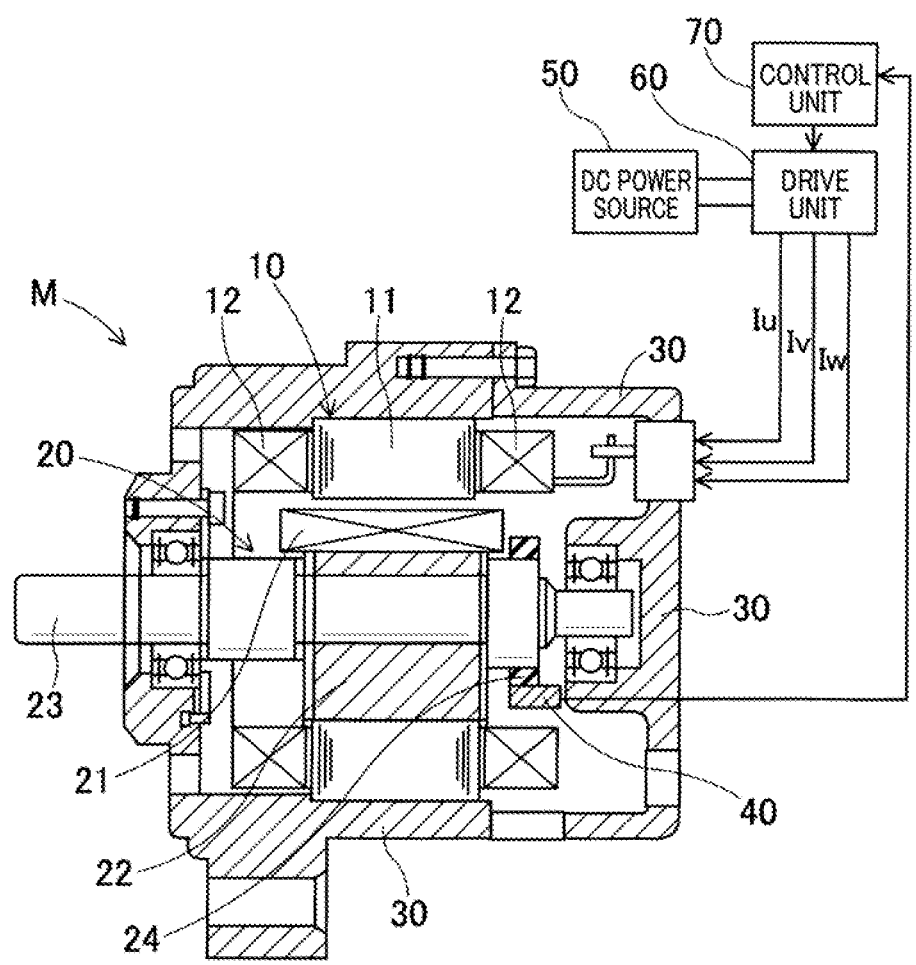
FIG. 1 is a schematic view illustrating a first configuration example of a field winding type rotating electric machine.

When the energization mode is rectangular-wave energization or overmodulation energization, it may be impossible to excite a field winding only by performing control, using the aforementioned conventional technique (see, for example, Japanese Patent No. JPS403338B2), so as to make the average value of each phase voltage equal to zero. In this case, it may be difficult to improve the performance (e.g., torque and rotational speed) that depends on the excitation of the field winding. In addition, the field winding, which is wound on a rotor core, is separated from the outside of the rotor; therefore, it is necessary to excite the field winding with magnetic fields generated by controlling waveforms of voltages applied to stator windings.

The inventor of the present application has considered that in the case of exciting a field winding from stator windings of a plurality of phases, inducing an excitation magnetic flux by electric currents of at least two phases is effective in providing a significant difference as the excitation magnetic flux.

The present disclosure has been made in view of the above circumstances and aims to provide a field winding type rotating electric machine capable of exciting a field winding when the energization mode is rectangular-wave energization or overmodulation energization.

With the configuration of the above-described field winding type rotating electric machine according to the present disclosure, the voltage pulse pair, which induces the current pulse pair, is generated in the second phase and the third phase after the predetermined angle from the reference time of the first phase in which fundamental current flows. Consequently, it becomes possible to generate excitation magnetic flux in the stator windings by the induced current pulse pair, thereby exciting the field winding with a significant difference provided by the second and third phases. As a result, it becomes possible to excite, when performing the rectangular-wave energization or the overmodulation energization, the field winding from the stator windings, thereby further improving the performance.

Furthermore, according to the present disclosure, the length of the temporary ON duration and the length of the temporary OFF duration are each set to be 0.5-10% of one cycle of the control signal of the first phase. With this configuration, it is possible to reliably excite the field winding without significantly affecting the fundamental current flowing in the stator winding of the first phase.

Furthermore, according to the present disclosure, the predetermined range is $\cos^{-1} \theta - 30° \leq \delta \leq \cos^{-1} \theta + 30°$. Generating the voltage pulse pair with the predetermined angle in this predetermined range, it is possible to reliably generate the current pulse pair when performing the rectangular-wave energization or the overmodulation energization.

Furthermore, according to the present disclosure, the start timing of one of the temporary ON duration and the temporary OFF duration is delayed by a delay period ($\beta$, $\beta 1$, $\beta 2$) from the start timing of the other of the temporary ON duration and the temporary OFF duration. With this configuration, it is possible to generate the current pulse pair having a significant difference with respect to the fundamental current flowing in the stator winding of the first phase. Consequently, it becomes possible to excite, when performing the rectangular-wave energization or the overmodulation energization, the field winding from the stator windings, thereby further improving the performance.

Furthermore, according to the present disclosure, the controller is configured to generate, with respect to each phase, the pair of a positive voltage pulse ($\alpha 1$, $\gamma 2$) and a negative voltage pulse ($\alpha 2$, $\gamma 1$) once or twice during each cycle of electrical angle. With this configuration, it is possible to adjust, by selecting the number of times of generation of the voltage pulse pair to be once or twice, the amount of the excitation magnetic flux, which excites the field winding, or the amount of the field current according to the rotational speed of the rotor.

Furthermore, according to the present disclosure, the field winding type rotating electric machine further includes a capacitive element (C1, C1a, C1b) that has one end connected between two ends of the field winding and the other end connected to a terminal of the rectifying element. With this configuration, it is possible to store in the capacitive element electric charge corresponding to a voltage canceled by electric current flowing in the field winding and discharge and effectively utilize the electric charge upon the direction of the electric current being changed.

Furthermore, according to the present disclosure, the rotor is one of a salient pole type rotor and a Lundell type rotor. The salient pole type rotor has the field winding concentratedly wound on each pole. The Lundell type rotor has a boss portion on which the field winding is wound, and a plurality of claw pole portions extending from corresponding ends of the boss portion. Each of the claw pole portions forms an N pole or an S pole. With this configuration, in the field winding type rotating electric machine that includes the salient pole type rotor or the Lundell type rotor, it is possible to excite, when performing the rectangular-wave energization or the overmodulation energization, the field winding from the stator windings, thereby further improving the performance.

Furthermore, according to the present disclosure, the rotor includes main magnetic pole portions and auxiliary magnetic pole portions. The main magnetic pole portions are first convex portions of the rotor core which face the stator. The auxiliary magnetic pole portions are second convex portions of the rotor core which have a narrower circumferential width than the first convex portions. The auxiliary magnetic pole portions have magnets provided therein. The magnets are magnetized in a direction canceling magnetic fields of the stator. Though magnetic flux generated by the rotating magnetic field of the stator mostly flows through the main magnetic pole portions, there are also leakage magnetic fluxes. Therefore, the amount and direction of magnetic flux passing through the field winding vary depending on the position of the field winding. With the above configuration, it is possible to form inter-pole boundaries with the auxiliary magnetic pole portions; thus it is possible for the magnets to suppress magnetic flux leaking between the poles. Consequently, it is possible to cause magnetic flux to efficiently flow inside the poles, thereby effectively obtaining the field current.

In addition, the "plurality of phases" may be three or more phases including the first phase, the second phase and the third phase, to the extent that the "plurality of phases" may be wound in the stator. The "field winding type rotating electric machine" may be applied to any rotating electric machines that include a rotor with a field winding and a rotating shaft. These rotating electric machines include, for example, electric generators, electric motors and motor-generators that operate selectively as an electric motor or an electric generator. The "sine-wave energization", the "rectangular-wave energization" and the "overmodulation energization" are distinguished according to the differences in the modulation factors of the voltage pulses (i.e., the pulse waves of voltages applied to the stator windings). "ON" denotes the pulse voltages being in the state of a high level, and has the same meaning as "1" or "H (High)" expressed according to positive logic. In contrast, "OFF" denotes the pulse voltages being in the state of a low level, and has the same meaning as "0" or "L (Low)" expressed according to positive logic. The expressions according to negative logic are opposite to those according to positive logic. The "center of an ON duration or an OFF duration" may be the middle time point between the start and the end of the duration or a time point within an allowable range taking the middle time point as a reference time point. The magnets may be permanent magnets or electromagnets.

Hereinafter, exemplary embodiments will be described with reference to the drawings. In addition, unless specified otherwise, "connecting" denotes electrically connecting.

First Embodiment

The first embodiment, which is an example of exciting a field winding when the energization mode is rectangular-wave energization, will be described with reference to FIGS. 1-19. Here, rectangular-wave energization and overmodulation energization are modulation controls such that the modulation factor m is higher than or equal to a given value. The given value is [1.0] in a normal control and [1.15] in a specific control. The specific control may be, for example, overmodulation energization in the case of using a third-harmonic superimposition method or two-phase modulation method in a pulse width modulation control (i.e., PWM control). In contrast, a sine-wave modulation is a control of modulating so that the modulation factor m is lower than a given value.

FIG. 1 shows a field winding type rotating electric machine M whose power factor is cos θ. The field winding type rotating electric machine M includes a stator 10, a rotor 20, a housing 30, a drive unit (or driver) 60 and a control unit (or controller) 70. The rotation drive of the field winding type rotating electric machine M is controlled by stator currents (armature currents) that are outputted from the drive unit 60 according to control signals transmitted from the control unit 70. The field winding type rotating electric machine M of the present embodiment is of an inner rotor type having the stator 10 arranged radially outer side and the rotor 20 arranged radially inner side. In addition, the drive unit 60 and the control unit 70 may be provided either inside or outside the housing 30; the configuration examples and functions of the drive unit 60 and the control unit 70 will be described later.

Figure 2:
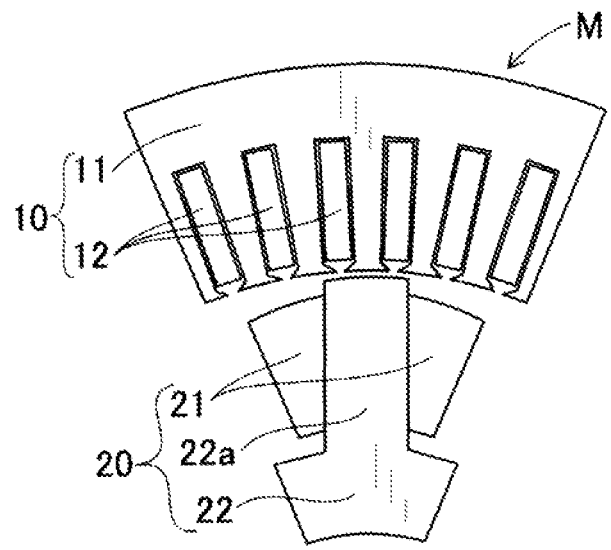
FIG. 2 is a radial cross-sectional view partially illustrating a first configuration example of a stator and a rotor.

As shown in FIG. 2, the stator 10 includes a stator core 11 and stator windings (armature windings) 12. The stator core 11 has a plurality of core teeth each radially extending and a plurality of slots each being formed between one circumferentially-adjacent pair of the core teeth. In the slots, the stator windings 12 of a plurality of phases are received in a required winding form. In the present embodiment, the plurality of phases are three phases consisting of U, V and W phases; the required winding form is distributed winding. In the example shown in FIG. 1, the aforementioned stator currents are U-phase current Iu flowing in the U-phase winding, V-phase current Iv flowing in the V-phase winding and W-phase current Iw flowing in the W-phase winding. In addition, any one of the three phases may be referred to as a "first phase" and the remaining two phases may be respectively referred to as a "second phase" and a "third phase".

Figure 3:
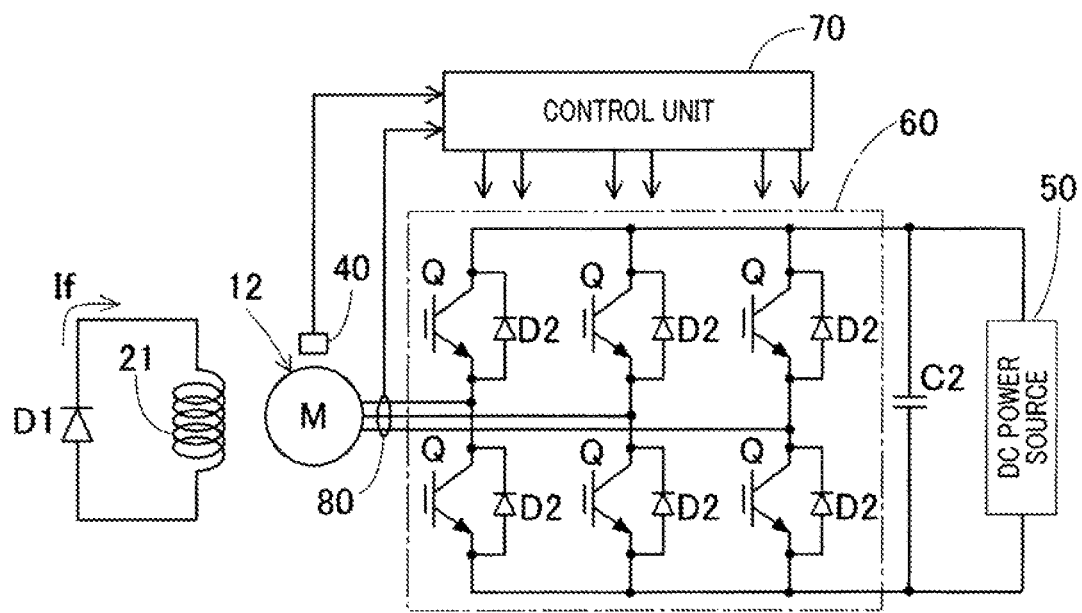
FIG. 3 is a schematic view illustrating a configuration example including a drive unit and an excitation winding circuit.

The rotor 20 is configured to rotate facing the stator 10. The rotor 20 includes a field winding 21, a rotor core 22 and a rectifying element D1. The rotor core 22 has a plurality of main magnetic pole portions 22a. The main magnetic pole portions 22a may also be referred to as "salient poles" or simply "poles". The main magnetic pole portions 22a are first convex portions extending toward the stator 10 side. The number of the main magnetic pole portions 22a may be set to any arbitrary number greater than or equal to 2. In the rotor 20 of the present embodiment, the number of the main magnetic pole portions 22a is set to 8. That is, the number of poles is equal to 8; the number of pole pairs is equal to 4. The field winding 21 is wound on each of the main magnetic pole portions 22a so as to have the polarities of each circumferentially-adjacent pair of the main magnetic pole portions 22a different from each other. The winding form of the field winding 21 is concentrated winding of concentratedly winding the field winding 21 with respect to the main magnetic pole portions 22a. As shown in FIG. 3, the field winding 21 and the rectifying element D1 are serially connected to form a field circuit which is a closed circuit. The rectifying element D1 restricts (rectifies) field current If flowing in the field circuit to in one direction.

A shaft 23, on which the rotor 20 is fixed, is employed as a main shaft or rotating shaft of the field winding type rotating electric machine M. On an outer circumferential surface of one end portion of the shaft 23, there are provided detected portions 24. The detected portions 24 of the present embodiment are magnetic salient poles provided at constant intervals in the circumferential direction of the outer circumferential surface.

The housing 30 fixes the stator 10 thereto and rotatably supports the rotor 20 via bearings. A rotation sensor 40 is provided in either inside or outside the housing 30. The rotation sensor 40 is configured to detect rotation information (i.e., rotational position and rotational speed) by detecting the magnetic salient poles of the detected portions 24 and output the detected rotation information to the control unit 70.

The rotation sensor 40 may be any sensor such that it can detect information on the rotation of the rotor 20 (e.g., rotational speed or rotational position). In the present embodiment, the rotation sensor 40 is implemented by a resolver. The resolver detects the magnetic salient poles of the detected portions 24 and transmits to the control unit 70 a signal (e.g., an analog signal or a digital signal) indicative of the rotation information.

A current sensor 80 shown in FIG. 3 may be any current sensor such that it can detect the stator currents (i.e., the phase currents Iu, Iv and Iw). The current sensor 80 of the present embodiment is implemented by an open-loop type sensor that detects, with Hall-effect elements, magnetic fields created by the stator currents that are the detected electric currents.

FIG. 3 shows the configuration for controlling drive of the filed winding type rotating electric machine M. A DC power source 50 supplies, via a smoothing capacitive element C2 connected in parallel thereto, electric power to the drive unit 60. The DC power source 50 is implemented by a battery, more particularly by a secondary battery in the present embodiment. The secondary battery may be, for example, one or more of a lithium-ion battery, a lithium-ion polymer battery, a lead-acid battery and a nickel-metal hydride battery.

The drive unit 60 functions as an inverter. The drive unit 60 has, for each phase, two element pairs respectively corresponding to a positive voltage and a negative voltage; each element pair consists of a switching element Q and a rectifying element D2. That is, in the present embodiment, the drive unit 60 has a total of six element pairs for the three phases. The drive unit 60 performs switching according to the control signals transmitted from the control unit 70, thereby outputting a required electric power at a required frequency to the field winding type rotating electric machine M. Each switching element Q is implemented by, for example, an IGBT. Each rectifying element D2 is connected, for functioning as a freewheeling diode, between a collector terminal and an emitter terminal of the corresponding switching element Q so that the direction of electric current flowing through the rectifying element D2 is opposite to the direction of electric current flowing through the corresponding switching element Q.

The control unit 70 outputs, based on a command signal received from an external device not shown in the figures, the control signals to the drive unit 60 (specifically, control terminals of the switching elements Q). In the present embodiment, the external device is an ECU. i.e., electronic control unit. The control signals are signals for performing, according to the rotational speed of the rotor 20, any of a sine-wave energization, rectangular-wave energization and overmodulation energization.

The controller 70 has a function of outputting, when performing the rectangular-wave energization, to the drive unit 60 the control signals that are obtained by adding voltage pulse pairs for energizing the field winding 21 to fundamental waves of the stator currents supplied to the stator windings 12. The fundamental waves of the stator currents correspond to synchronous currents (i.e., the fundamental waves of the phase currents Iu, Iv and IW) for creating a rotating magnetic field which rotates at an electrical angular speed that depend on the rotational speed of the rotor 20. The voltage pulses of each voltage pulse pair are added, when the V-phase current Iv that is of the first phase has a maximum value or a minimum value, respectively to the U phase that is the second phase and the W phase that is the third phase so as to be opposite to each other, thereby adding pulse currents to the U-phase current Iu and the W-phase current Iw. Magnetic field created in the stator windings 12 by the pulse currents excite the field winding 21, thereby generating the field current.

Examples of the control signals, which are transmitted from the control unit 70 to the drive unit 60 in the field winding type rotating electric machine M configured as described above, will be described with reference to FIGS. 4-19.

A. Examples of Setting Reference Times to the Centers of ON Durations of the First Phase First, referring to FIGS. 4-12, examples will be described where reference times are set to the centers of ON durations of the control signal (specifically, the pulse signal) for driving the switching elements Q of the first phase.

Figure 4:
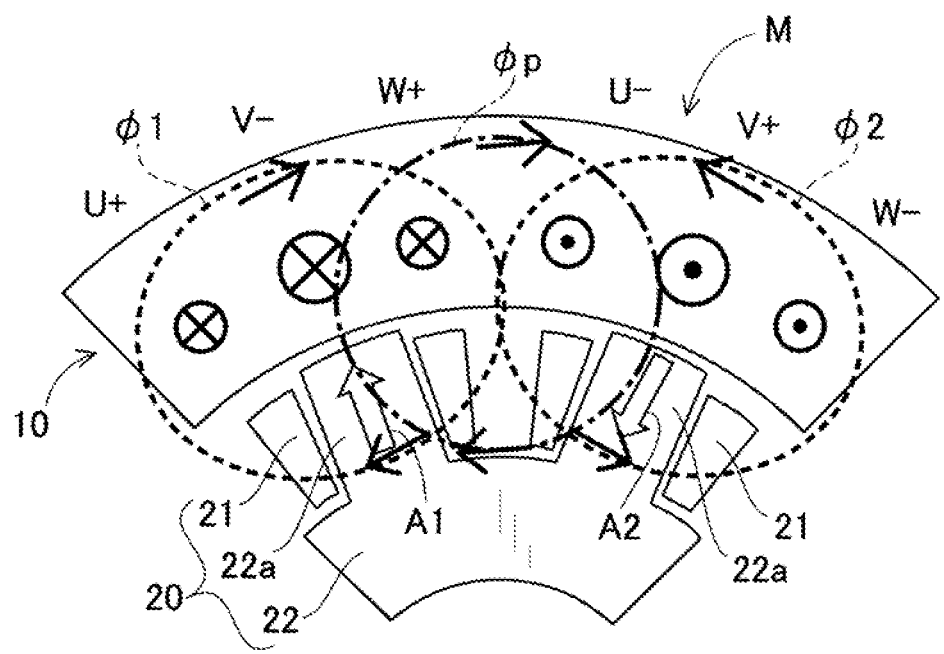
FIG. 4 is a schematic view illustrating an example of magnetic fields created in the stator and the rotor when reference times are set to the centers of ON durations of a first phase.

FIG. 4 illustrates magnetic fields created when the V-phase current Iv that is of the first phase has its maximum value. In FIG. 4, "U", "V" and "W" respectively designate the stator windings 12 of the three phases, and "+" and "−" indicate directions of the electric currents flowing in the stator windings 12. For example, "U+" denotes that electric current flows in the U-phase winding in a direction out of the paper surface of FIG. 4, whereas "V−" denotes that electric current flows in the V-phase winding in a direction into the paper surface of FIG. 4.

When exciting the field winding 21 from the stator windings 12, inducing an excitation magnetic flux by electric currents supplied to the stator windings 12 of at least two phases is effective in providing a significant difference as the excitation magnetic flux. For example, taking the V-phase winding that is of the first phase as a reference winding, the excitation magnetic flux is induced by electric currents supplied to the U-phase winding that is of the second phase and the W-phase winding that is of the third phase.

When the V-phase current iv flowing in the V-phase winding that is of the first phase has its maximum value, as shown in FIG. 4, between the stator 10 and the rotor 20, there are created both a magnetic field $\phi 1$ in a clockwise direction and a magnetic field $\phi 2$ in a counterclockwise direction. That is, the circumferentially-adjacent magnetic fields $\phi 1$ and $\phi 2$ induce magnetic fluxes flowing in opposite directions to each other. Consequently, the main magnetic pole portion 22a on the left side in FIG. 4 is magnetized in the direction of an arrow A1 to form an N pole while the main magnetic pole portion 22a on the right side in FIG. 4 is magnetized in the direction of an arrow A2 to form an S pole.

When exciting the field winding 21, it is possible to create a magnetic field $\phi p$ as shown with a one-dot chain line in FIG. 4 at the same time as the creation of the magnetic fields $\phi 1$ and $\phi 2$. Similar to the magnetic field $\phi 1$, the magnetic field $\phi p$ shown in FIG. 4 induces magnetic flux flowing clockwise between the stator 10 and the rotor 20, thereby exciting the field winding 21 wound on the main magnetic pole portions 22a. Upon the field winding 21 being excited by the magnetic field $\phi p$, the field current If, which is caused by the magnetic field $\phi p$ as well as by the magnetic fields $\phi 1$ and $\phi 2$, flows in the field circuit shown in FIG. 3.

Figure 5:
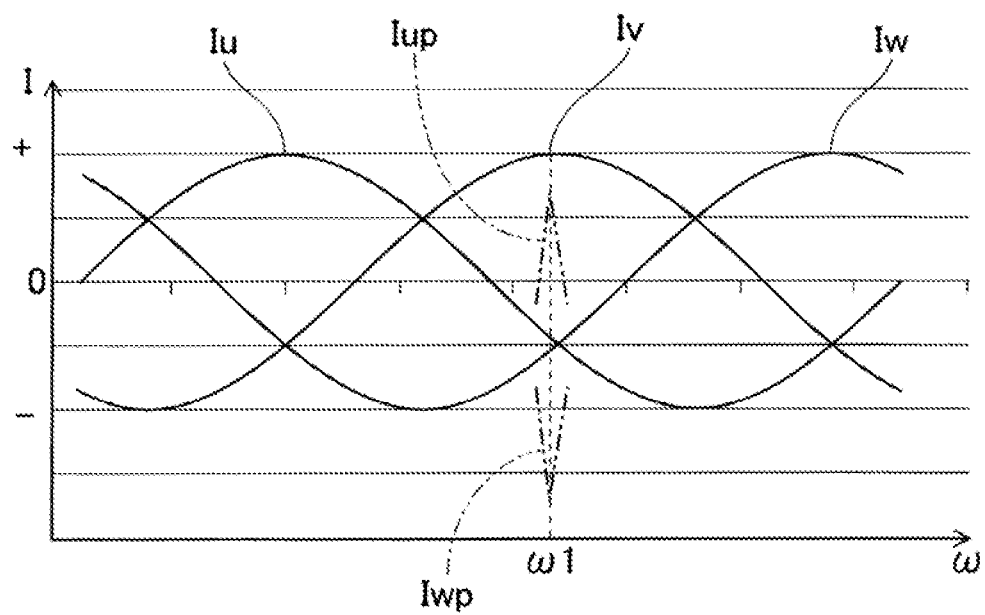
FIG. 5 is a schematic view illustrating an example of stator currents by which a field winding is excited.

To provide a significant difference as the excitation magnetic flux, as shown in FIG. 5, pulse currents may be added to the U-phase current Iu and the W-phase current Iw. In the example shown in FIG. 5, at electrical angle $\omega 1$ where the V-phase current Iv has its maximum value, positive pulse current Iup is added to the U-phase current Iu and negative pulse current Iwp is added to the W-phase current Iw. Specifically, the pulse current Iup is caused to flow in the U-phase winding that is designated by "U−" in FIG. 4 and the pulse current Iwp is caused to flow in the W-phase winding that is designed by "W+" in FIG. 4. The pulse currents Iup and Iwp together correspond to a "current pulse pair". As above, it is possible to provide a significant difference as the excitation magnetic flux by adding the pulse currents Iup and Iwp in opposite directions to the U-phase current Iu and the W-phase current Iw that respectively flow in the circumferentially-adjacent stator windings 12. Moreover, to generate the pulse currents Iup and Iwp, the control unit 70 may output to the drive unit 60 the control signals that have the three-phase voltage waveforms as shown in FIG. 6.

Figure 6:
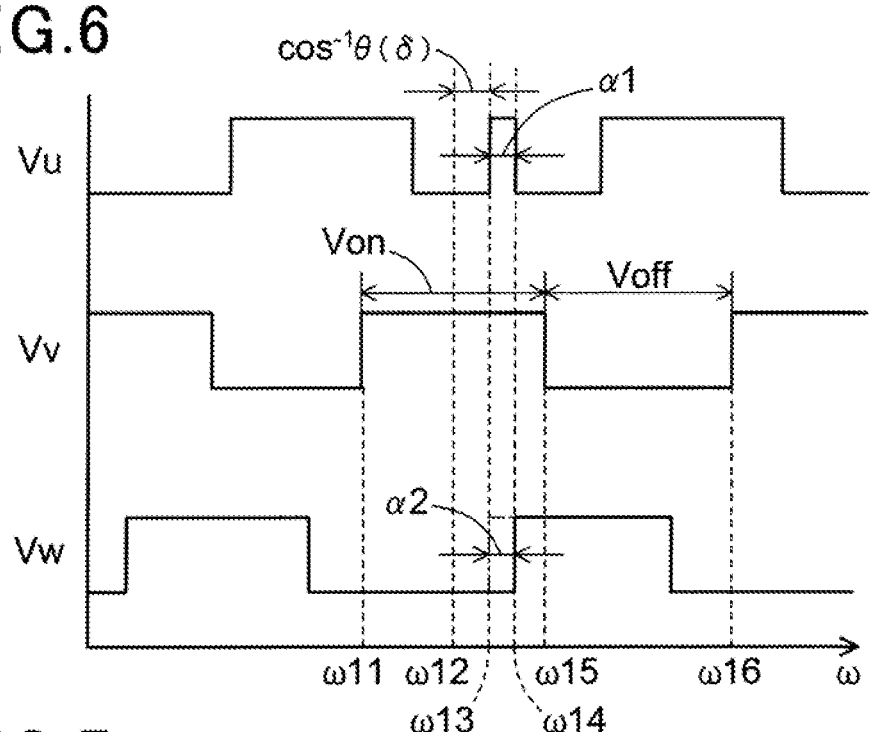
FIG. 6 is a schematic view illustrating an example of controlling the ON/OFF states of each phase by a control unit.

In FIG. 6, the V-phase voltage Vv that is of the first phase repeats ON durations Von and OFF durations Voff alternately taking the time period from electrical angle ω11 to electrical angle ω16 as one cycle (i.e., 360° in electrical angle). The time period from electrical angle ω11 to electrical angle ω15 is an ON duration Von. The time period from electrical angle ω15 to electrical angle ω16 is an OFF duration Voff. The V-phase current Iv has its maximum value at the center of the ON duration Von. The center of the ON duration Von may be the middle time point between the start and the end of the ON duration or a time point within an allowable range taking the middle time point as a reference time point. In FIG. 6, the center of the ON duration Von is electrical angle ω12, and represents a reference time Sv. At a timing delayed from the reference time Sv by $\cos^{-1}\theta$ in electrical angle, the voltages of the second and third phases are temporarily turned ON or OFF. The electrical angle $\cos^{-1}\theta$ corresponds to a "predetermined angle δ".

Specifically, the temporary ON duration α1 from electrical angle ω13 to electrical angle ω14, which corresponds to a "positive voltage pulse", is a duration for which the U-phase voltage Vu is temporarily kept ON. Similarly, the temporary OFF duration α2 from electrical angle ω13 to electrical angle ω14, which corresponds to a "negative voltage pulse", is a duration for which the W-phase voltage Vw is temporarily kept OFF. The pair of the positive voltage pulse and the negative voltage pulse corresponds to a "voltage pulse pair". Upon the U-phase voltage Vu being temporarily turned ON, the pulse current Iup as shown in FIG. 5 is generated. Similarly, upon the W-phase voltage Vw being temporarily turned OFF, the pulse current Iwp as shown in FIG. 5 is generated. The pulse currents Iup and Iwp, which together correspond to a "current pulse pair", are generated in opposite directions to each other with respect to the amplitude directions of the phase currents.

The reason of delaying the start timings of the temporary ON duration α1 and the temporary OFF duration α2 from the reference time Sv by $\cos^{-1}\theta$ in electrical angle is that the phase currents flowing in the stator windings 12 are delayed with respect to the phase voltages applied to the stator windings 12 by $\cos^{-1}\theta$ in electrical angle which corresponds to the power factor (i.e., cos θ). The power factors of general rotating electric machines are such that 0.5≤cos θ≤0.9; therefore, 25°≤$\cos^{-1}\theta$≤60° in electrical angle.

It is preferable that both the length of the temporary ON duration α1 and the length of the temporary OFF duration α2 are 0.5-10% of the cycle of the fundamental waves of the voltage pulses. With decrease in the lengths of the temporary ON duration α1 and the temporary OFF duration α2, it becomes difficult to obtain the pulse currents. In contrast, with increase in the lengths of the temporary ON duration α1 and the temporary OFF duration α2, the influence of the voltage pulses on the fundamental waves becomes large.

The cycle of the pulse currents Iup and Iwp is only about 1/10 of the cycle of the fundamental U-phase and W-phase currents Iu and Iw. Therefore, the phase difference between the phase voltages and the phase currents is negligible compared to the case of the fundamental waves.

In the above-described example shown in FIGS. 4-6, the reference time Sv is set to the time point at which the V-phase current Iv has its maximum value. It is preferable that electric currents supplied to the stator windings 12 are balanced for the three phases. Accordingly, it is preferable that the above process is performed for each of the three phases. Specifically, with the first phase being the U phase, a reference time Su is set to a time point at which the U-phase current Iu has its maximum value; at a timing delayed from the reference time Su by $\cos^{-1}\theta$ in electrical angle, the W-phase voltage Vw that is of the second phase is temporarily turned ON and the V-phase voltage Vv that is of the third phase is temporarily turned OFF. Similarly, with the first phase being the W phase, a reference time Sw is set to a time point at which the W-phase current Iw has its maximum value; at a timing delayed from the reference time Sw by $\cos^{-1}\theta$ in electrical angle, the V-phase voltage Vv that is of the second phase is temporarily turned ON and the U-phase voltage Vu that is of the third phase is temporarily turned OFF.

Figure 7:
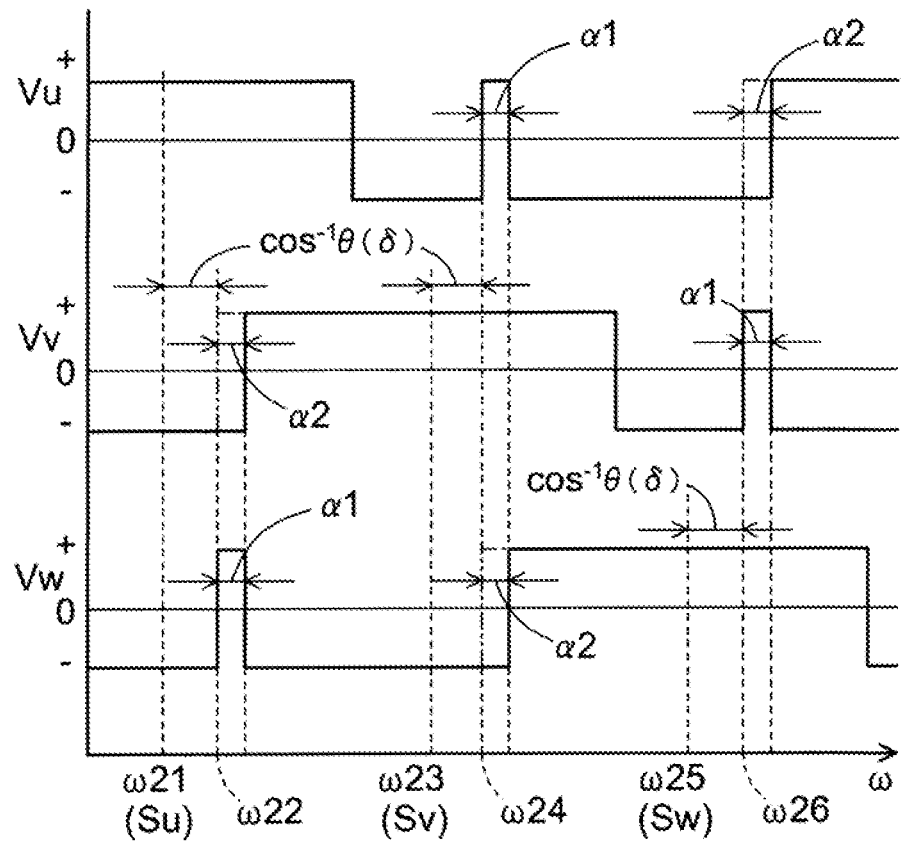
FIG. 7 is a schematic view illustrating a simulation example of control of each phase.
Figure 8:
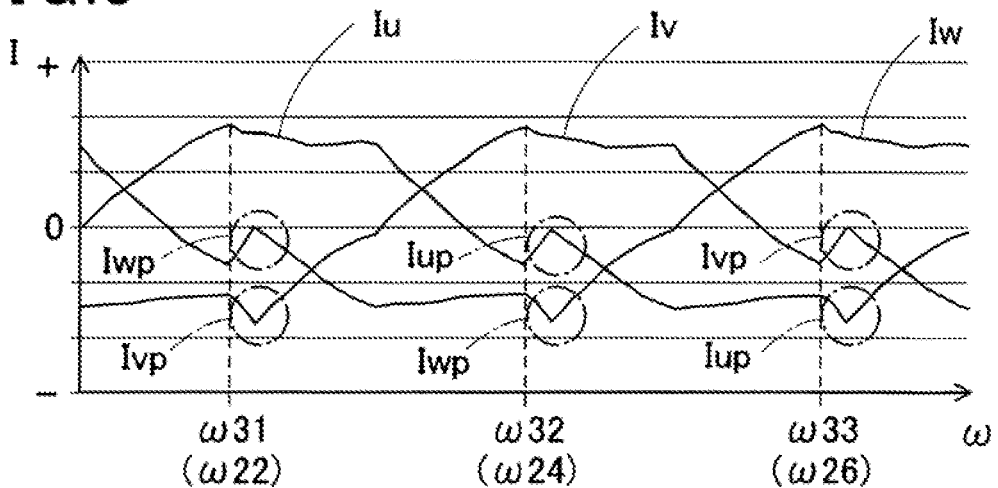
FIG. 8 is a schematic view illustrating electric currents flowing in stator windings in the simulation example of FIG. 7.
Figure 9:
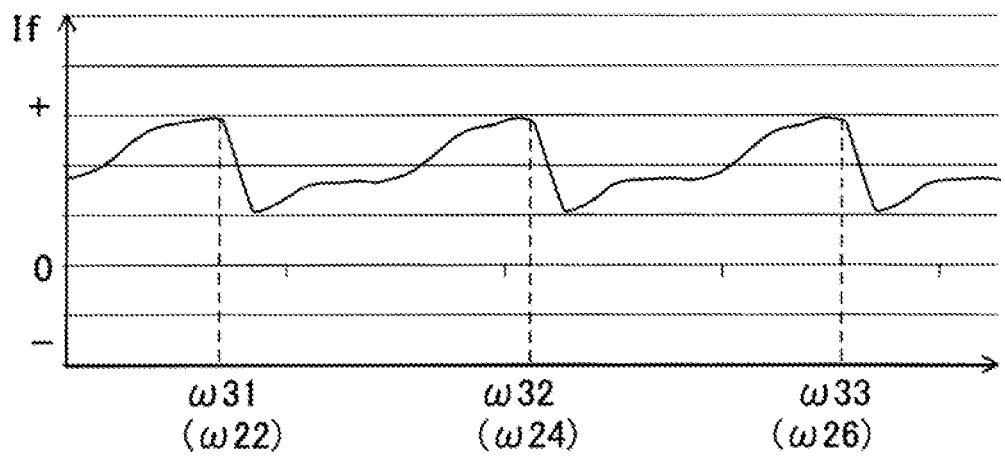
FIG. 9 is a schematic view illustrating electric current flowing in the field winding in the simulation example of FIG. 7.

The results of a simulation, which was performed for the control signals outputted from the control unit 70 to the drive unit 60 and the electric currents flowing in the stator windings 12 in response to the control signals, are shown in FIGS. 7-9. In this simulation, for balancing the three phases, current pulse pairs were generated with any one of the three phases being the first phase and the remaining two phases being the second and third phases.

FIG. 7 shows the control signals outputted from the control unit 70 to the drive unit 60, i.e., shows a control example of the U-phase voltage Vu, the V-phase voltage Vv and the W-phase voltage Vw. In the case of the first phase being the U phase, a reference time Su is set to electrical angle ω21 that is the center of an ON duration Von of the U-phase voltage Vu. Electrical angle ω22 is delayed from the reference time Su by $\cos^{-1}\theta$ in electrical angle. From electrical angle ω22, the W-phase voltage Vw that is of the second phase is turned ON for a temporary ON duration α1 and the V-phase voltage Vv that is of the third phase is turned OFF for a temporary OFF duration α2.

In the case of the first phase being the V phase, a reference time Sv is set to electrical angle ω23 that is the center of an ON duration Von of the V-phase voltage Vv. Electrical angle ω24 is delayed from the reference time Sv by $\cos^{-1}\theta$ in electrical angle. From electrical angle ω24, the U-phase voltage Vu that is of the second phase is turned ON for a temporary ON duration α1 and the W-phase voltage Vw that is of the third phase is turned OFF for a temporary OFF duration α2.

In the case of the first phase being the W phase, a reference time Sw is set to electrical angle ω25 that is the center of an ON duration Von of the W-phase voltage Vw. Electrical angle ω26 is delayed from the reference time Sw by $\cos^{-1}\theta$ in electrical angle. From electrical angle ω26, the V-phase voltage Vv that is of the second phase is turned ON for a temporary ON duration α1 and the U-phase voltage Vu that is of the third phase is turned OFF for a temporary OFF duration α2.

FIG. 8 shows the changes in the phase currents caused by the control signals shown in FIG. 7 to flow in the stator windings 12. From electrical angle ω31 shown in FIG. 8, pulse currents Iwp and Ivp are generated corresponding to the temporary ON duration α1 and the temporary OFF duration α2 that are controlled from electrical angle ω22 shown in FIG. 7. Moreover, from electrical angle ω32 shown in FIG. 8, pulse currents Iup and Iwp are generated corresponding to the temporary ON duration α1 and the temporary OFF duration α2 that are controlled from electrical angle ω24 shown in FIG. 7. Furthermore, from electrical angle ω33 shown in FIG. 8, pulse currents Ivp and Iup are generated corresponding to the temporary ON duration α1 and the temporary OFF duration α2 that are controlled from electrical angle ω26 shown in FIG. 7.

FIG. 9 shows an example of change in the field current If flowing in the field winding 21. The field current If is generated by inducing the excitation magnetic flux by the electric currents flowing in the stator windings 12 and exciting the field winding 21 by the excitation magnetic flux. The electric currents flowing in the stator windings 12 include the pulse currents Iup, Ivp and Iwp shown by enclosing with one-dot chain lines in FIG. 8. The timings at which the field current If greatly changes coincide with the timings at which the pulse currents Iup, Ivp and Iwp are generated as shown in FIG. 8. That is, the field current If temporarily greatly changes from each of electrical angles ω31, ω32 and ω33.

Figure 10:
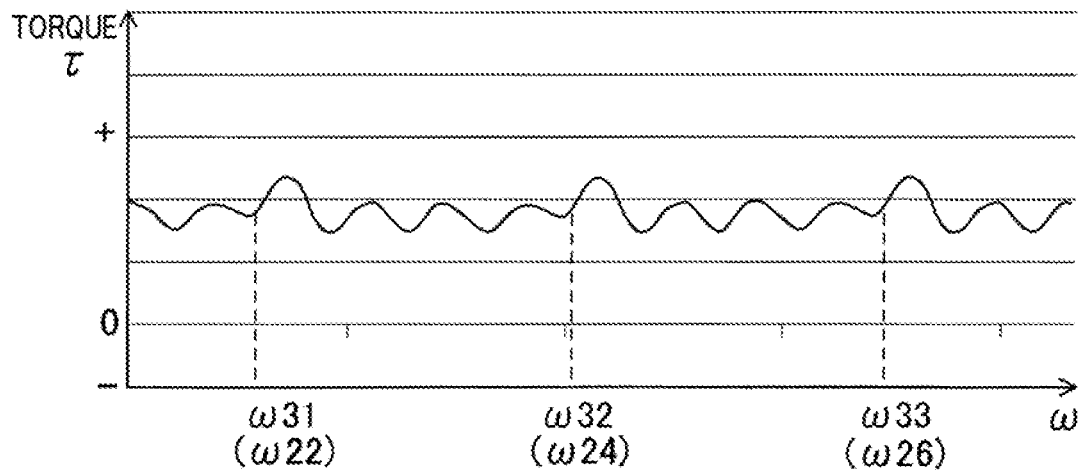
FIG. 10 is a schematic view illustrating change in torque in the simulation example of FIG. 7.

FIG. 10 shows an example of change in the torque τ outputted by the field winding type rotating electric machine M. The torque τ is outputted from the shaft 23 with rotation of the rotor 20 shown in FIG. 1 by inducing the excitation magnetic flux by the electric currents flowing in the stator windings 12. The timings at which the torque τ greatly changes coincide with the timings at which the pulse currents Iup, Ivp and Iwp are generated as shown in FIG. 8. That is, the torque τ temporarily greatly changes from each of electrical angles ω31, ω32 and ω33. Accordingly, it is clear that adding the pulse currents Iup, Ivp and Iwp to the fundamental currents of the phase currents (i.e., the U-phase current Iu, the V-phase current Iv and the W-phase current Iw), the torque τ of the field winding type rotating electric machine M is further improved.

Figure 11:
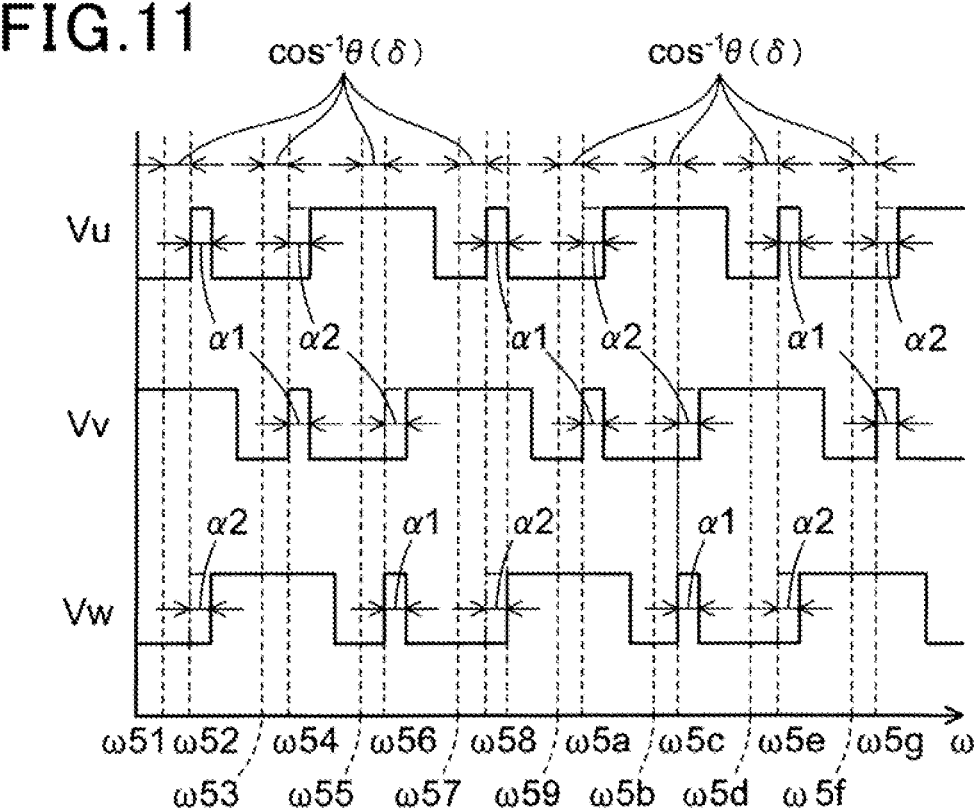
FIG. 11 is a schematic view illustrating a first example of controlling the ON/OFF states of each phase by the control unit.
Figure 12:
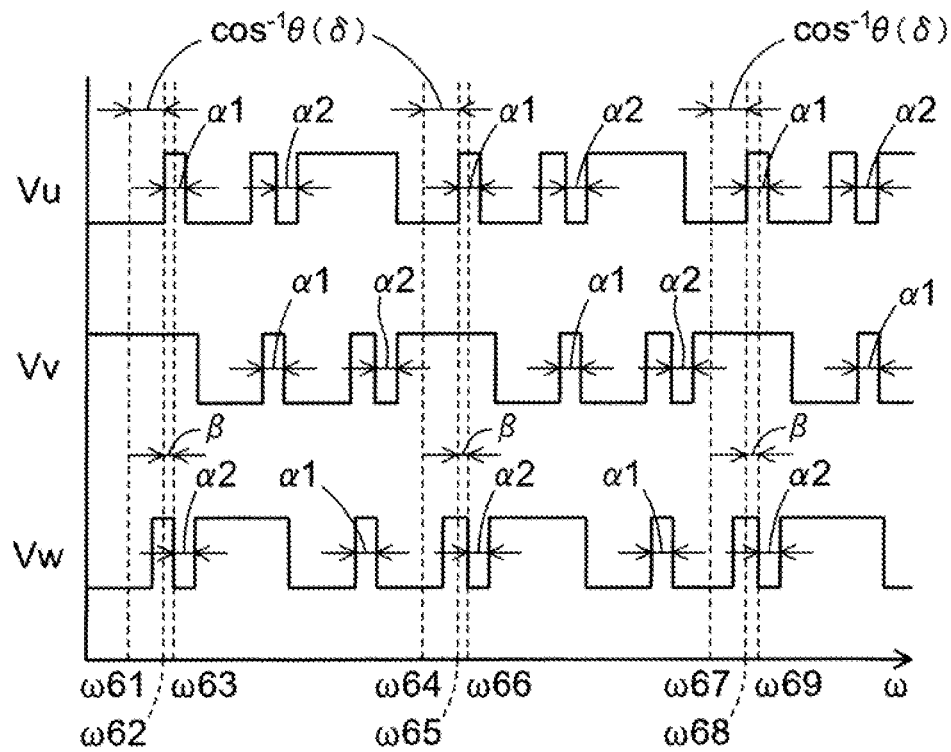
FIG. 12 is a schematic view illustrating a second example of controlling the ON/OFF states of each phase by the control unit.

FIGS. 11 and 12 show examples of the control signals transmitted from the control unit 70 to the drive unit 60. The control signals shown in FIGS. 11 and 12 cause current pulse pairs to be generated with one of the three phases being the first phase and the remaining two phases being the second and third phases.

FIG. 11 shows the same control example as FIG. 7. In this example, the start timings of temporary ON durations α1 and the start timings of corresponding temporary OFF durations α2 are set to the same timings. In the case of the first phase being the U phase, reference times Su are respectively set to electrical angles ω55 and ω5b that are respectively the centers of ON durations Von of the U-phase voltage Vu. Electrical angles ω56 and ω5c are delayed from the respective reference times Su by $\cos^{-1}\theta$ in electrical angle. From electrical angles ω56 and ω5c, the W-phase voltage Vw that is of the second phase is turned ON for temporary ON durations α1 and the V-phase voltage Vv that is of the third phase is turned OFF for temporary OFF durations α2.

In the case of the first phase being the V phase, reference times Sv are respectively set to electrical angles ω57 and ω5d that are respectively the centers of ON durations Von of the V-phase voltage Vv. Electrical angles ω58 and ω5e are delayed from the respective reference times Sv by $\cos^{-1}\theta$ in electrical angle.

From electrical angles ω58 and ω5e, the U-phase voltage Vu that is of the second phase is turned ON for temporary ON durations α1 and the W-phase voltage Vw that is of the third phase is turned OFF for temporary OFF durations α2.

In the case of the first phase being the W phase, reference times Sw are respectively set to electrical angles ω53, ω59 and ω5f that are respectively the centers of ON durations Von of the W-phase voltage Vw. Electrical angles ω54, ω5a and ω5g are delayed from the respective reference times Sw by $\cos^{-1}\theta$ in electrical angle. From electrical angles ω54, ω5a and ω5g, the V-phase voltage Vv that is of the second phase is turned ON for temporary ON durations α1 and the U-phase voltage Vu that is of the third phase is turned OFF for temporary OFF durations α2.

FIG. 12 shows a different control example from FIG. 7. In this example, temporary OFF durations α2 are delayed from corresponding temporary ON durations α1 by delay periods β. In FIG. 12, there is illustrated the case of the first phase being the V phase. In this case, reference times Sv are respectively set to electrical angles ω61, ω64 and ω67 that are respectively the centers of ON durations Von of the V-phase voltage Vv. Electrical angles ω62, ω65 and ω68 are delayed from the respective reference times Sv by $\cos^{-1}\theta$ in electrical angle. From electrical angles ω62, ω65 and ω68, the U-phase voltage Vu that is of the second phase is turned ON for temporary ON durations α1. Further, electrical angles ω63, ω66 and ω69 are respectively delayed from electrical angles ω62, ω65 and ω68 by the delay periods β. From electrical angles ω63, ω66 and ω69, the W-phase voltage Vw that is of the third phase is turned OFF for temporary OFF durations α2. That is, the start timings of the temporary OFF durations α2 are delayed from the respective reference times Sv by $(\cos^{-1}\theta+\beta)$ in electrical angle.

Moreover, in the case of the first phase being the U phase, the W-phase voltage Vw that is of the second phase is turned ON for temporary ON durations α1 that are respectively delayed from the centers of ON durations Von of the U-phase voltage Vu by $\cos^{-1}\theta$ in electrical angle; further, the V-phase voltage Vv that is of the third phase is turned OFF for temporary OFF durations α2 that are respectively delayed from the corresponding temporary ON durations α1 of the W-phase voltage Vw by delay periods β. Furthermore, in the case of the first phase being the W phase, the V-phase voltage Vv that is of the second phase is turned ON for temporary ON durations α1 that are respectively delayed from the centers of ON durations Von of the W-phase voltage Vw by $\cos^{-1}\theta$ in electrical angle; further, the U-phase voltage Vu that is of the third phase is turned OFF for temporary OFF durations α2 that are respectively delayed from the corresponding temporary ON durations α1 of the V-phase voltage Vv by delay periods β.

In addition, though the case of providing the delay periods β for the third phase is described above, it can be similarly applied to the opposite case. That is, in the case of the first phase being the V phase, the W-phase voltage Vw that is of the third phase is turned OFF for temporary OFF durations α2 that are respectively delayed from the centers of ON durations Von of the V-phase voltage Vv by $\cos^{-1}\theta$ in electrical angle; further, the U-phase voltage Vu that is of the second phase is turned ON for temporary ON durations α1 that are respectively delayed from the corresponding temporary OFF durations α2 of the W-phase voltage Vw by delay periods β.

Moreover, in the case of the first phase being the U phase, the V-phase voltage Vv that is of the third phase is turned OFF for temporary OFF durations α2 that are respectively delayed from the centers of ON durations Von of the U-phase voltage Vu by $\cos^{-1}\theta$ in electrical angle; further, the W-phase voltage Vw that is of the second phase is turned ON for temporary ON durations α1 that are respectively delayed from the corresponding temporary OFF durations α2 of the V-phase voltage Vv by delay periods β.

Furthermore, in the case of the first phase being the W phase, the U-phase voltage Vu that is of the third phase is turned OFF for temporary OFF durations α2 that are respectively delayed from the centers of ON durations Von of the W-phase voltage Vw by $\cos^{-1}\theta$ in electrical angle; further, the V-phase voltage Vv that is of the second phase is turned ON for temporary ON durations α1 that are respectively delayed from the corresponding temporary OFF durations α2 of the U-phase voltage Vu by delay periods β.

B. Examples of Setting Reference Times to the Centers of OFF Durations of the First Phase Next, referring to FIGS. 13-19, examples will be described where reference times are set to the centers of OFF durations of the control signal (specifically, the pulse signal) for driving the switching elements Q of the V phase that is of the first phase. In the above-described examples, the reference times are set to the centers of the ON durations of the first phase; the centers of the ON durations of the first phase represent timings at which the electric current flowing in the first-phase stator winding 12 has its maximum value. In contrast, in the examples described below, reference times are set to the centers of the OFF durations of the first phase; the centers of the OFF durations of the first phase represent timings at which the electric current flowing in the first-phase stator winding 12 has its minimum value.

Figure 13:
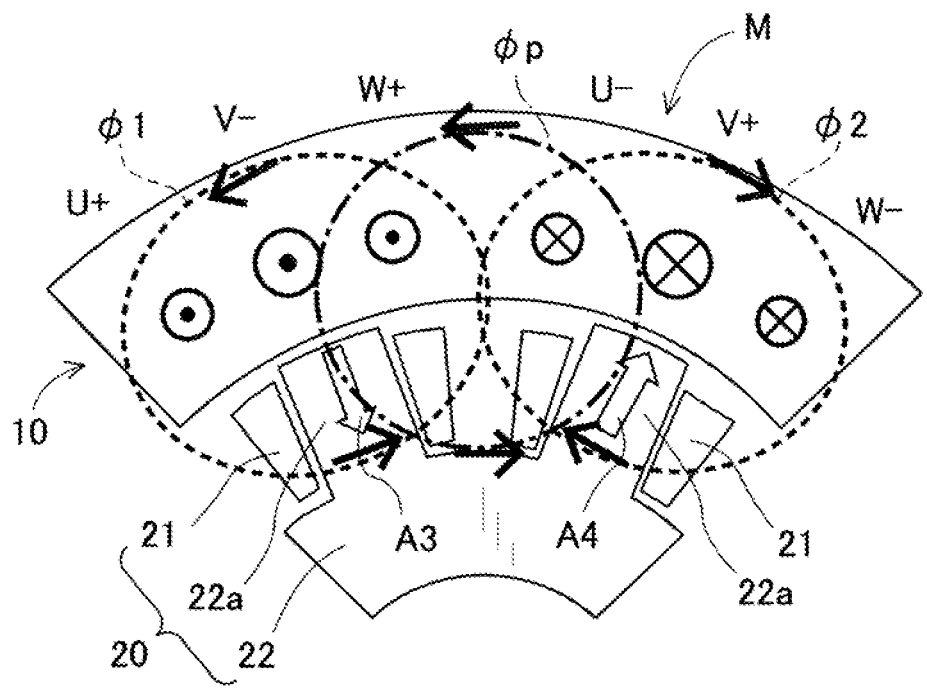
FIG. 13 is a schematic view illustrating an example of magnetic fields created in the stator and the rotor when reference times are set to the centers of OFF durations of the first phase.

Similar to FIG. 4, FIG. 13 illustrates magnetic fields created when the V-phase current Iv that is of the first phase has its minimum value. As in the case of setting the reference times to the centers of the ON durations of the first phase, when exciting the field winding 21 from the stator windings 12, inducing an excitation magnetic flux by electric currents supplied to the stator windings 12 of at least two phases is effective in providing a significant difference as the excitation magnetic flux.

When the V-phase current Iv flowing in the V-phase winding that is of the first phase has its minimum value, as shown in FIG. 13, between the stator 10 and the rotor 20, there are created both a magnetic field φ1 in a counterclockwise direction and a magnetic field φ2 in a clockwise direction. That is, the circumferentially-adjacent magnetic fields φ1 and φ2 induce magnetic fluxes flowing in opposite directions to each other. Consequently, the main magnetic pole portion 22a on the left side in FIG. 13 is magnetized in the direction of an arrow A3 to form an S pole while the main magnetic pole portion 22a on the right side in FIG. 13 is magnetized in the direction of an arrow A4 to form an N pole.

When exciting the field winding 21, it is possible to create a magnetic field φp as shown with a one-dot chain line in FIG. 13 at the same time as the creation of the magnetic fields φ1 and φ2.

The magnetic field φp shown in FIG. 13 induces magnetic flux flowing counterclockwise between the stator 10 and the rotor 20, thereby exciting the field winding 21 wound on the main magnetic pole portions 22a. Upon the field winding 21 being excited as above, the field current If flows in the field circuit shown in FIG. 3.

Figure 14:
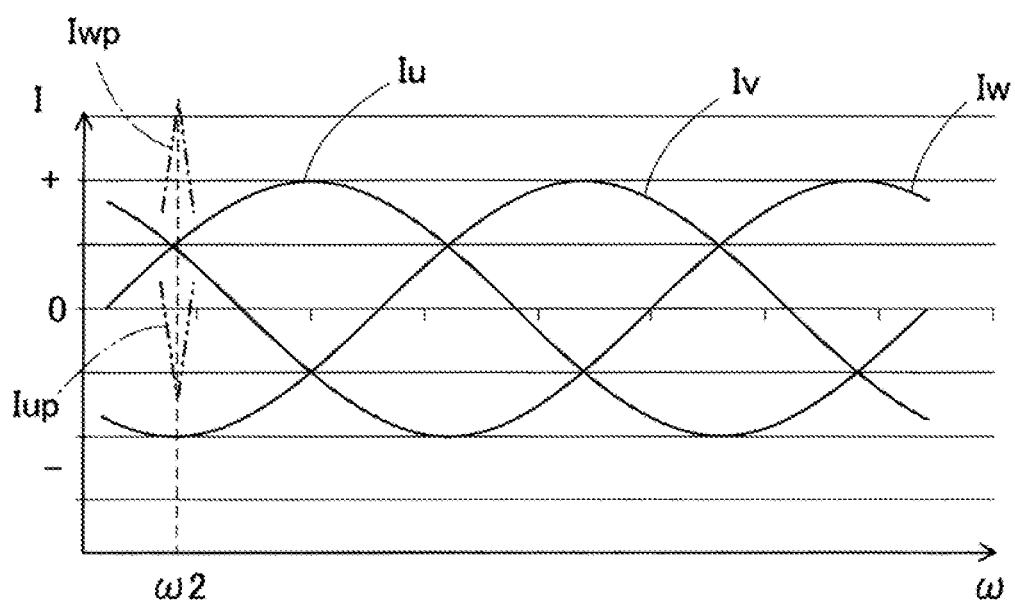
FIG. 14 is a schematic view illustrating an example of the stator currents by which the field winding is excited.

To provide a significant difference as the excitation magnetic flux, as shown in FIG. 14, pulse currents may be added to the U-phase current Iu and the W-phase current Iw. In the example shown in FIG. 14, at electrical angle ω2 where the V-phase current Iv has its minimum value, positive pulse current Iwp is added to the W-phase current Iw and negative pulse current Iup is added to the U-phase current Iu. Specifically, the pulse current Iup is caused to flow in the U-phase winding that is designated by "U−" in FIG. 13 and the pulse current Iwp is caused to flow in the W-phase winding that is designed by "W+" in FIG. 13. The pulse currents Iup and Iwp together correspond to a "current pulse pair". As above, it is possible to provide a significant difference as the excitation magnetic flux by adding the pulse currents Iwp and Iup in opposite directions to the W-phase current Iw and the U-phase current Iu that respectively flow in the circumferentially-adjacent stator windings 12. Moreover, to generate the pulse currents Iwp and Iup, the control unit 70 may output to the drive unit 60 the control signals that have the three-phase voltage waveforms as shown in FIG. 15.

Figure 15:
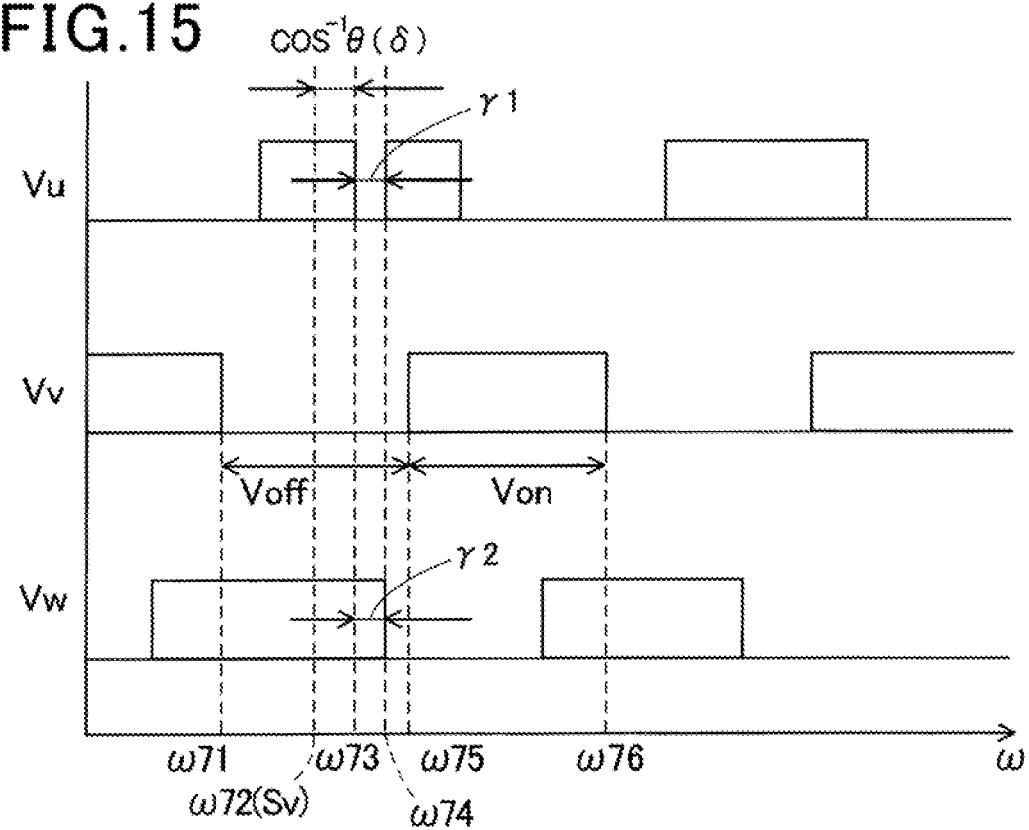
FIG. 15 is a schematic view illustrating an example of controlling the ON/OFF states of each phase by the control unit.

In FIG. 15, the V-phase voltage Vv that is of the first phase repeats OFF durations Voff and ON durations Von alternately taking the time period from electrical angle ω71 to electrical angle ω76 as one cycle (i.e., 360° in electrical angle). The time period from electrical angle ω71 to electrical angle ω75 is an OFF duration Voff. The time period from electrical angle ω75 to electrical angle ω76 is an ON duration Von. The center of the OFF duration Voff is electrical angle ω72, and represents a reference time Sv. At a timing delayed from the reference time Sv by $\cos^{-1}\theta$ in electrical angle, the voltages of the second and third phases are temporarily turned ON or OFF. Specifically, the temporary OFF duration γ1 from electrical angle ω73 to electrical angle ω74, which corresponds to a "negative voltage pulse", is a duration for which the U-phase voltage Vu is temporarily kept OFF. Similarly, the temporary ON duration γ2 from electrical angle ω73 to electrical angle ω74, which corresponds to a "positive voltage pulse", is a duration for which the W-phase voltage Vw is temporarily kept ON. Upon the U-phase voltage Vu being temporarily turned OFF, the negative pulse current Iup as shown in FIG. 14 is generated. Similarly, upon the W-phase voltage Vw being temporarily turned ON, the positive pulse current Iwp as shown in FIG. 14 is generated. The pulse currents Iup and Iwp, which together correspond to a "current pulse pair", are generated in opposite directions to each other with respect to the amplitude directions of the phase currents.

Figure 16:
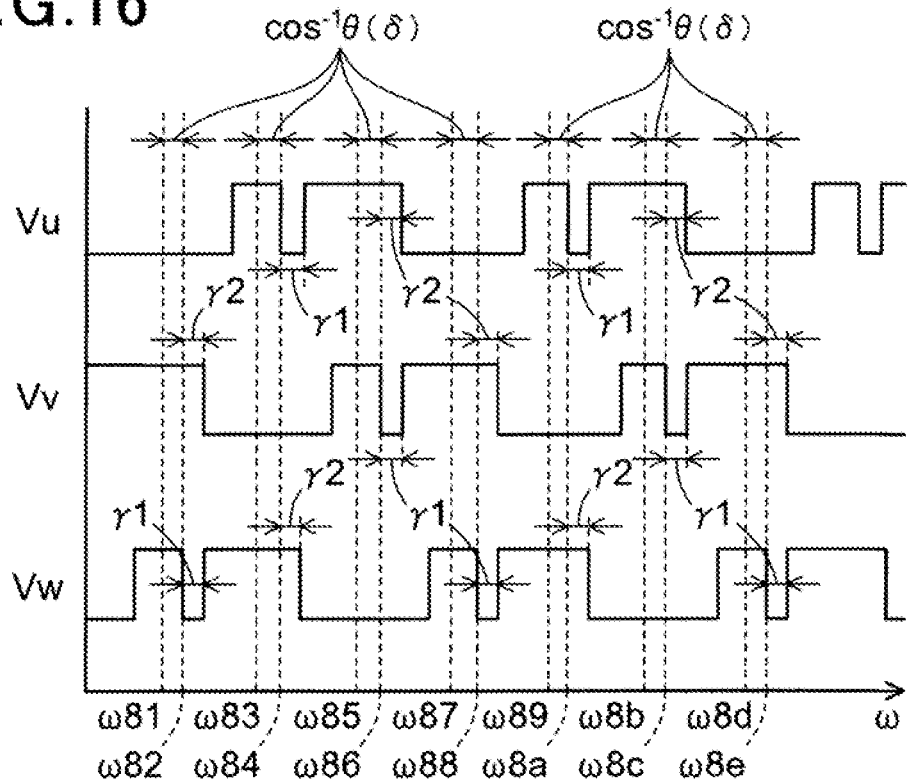
FIG. 16 is a schematic view illustrating a third example of controlling the ON/OFF states of each phase by the control unit.
Figure 17:
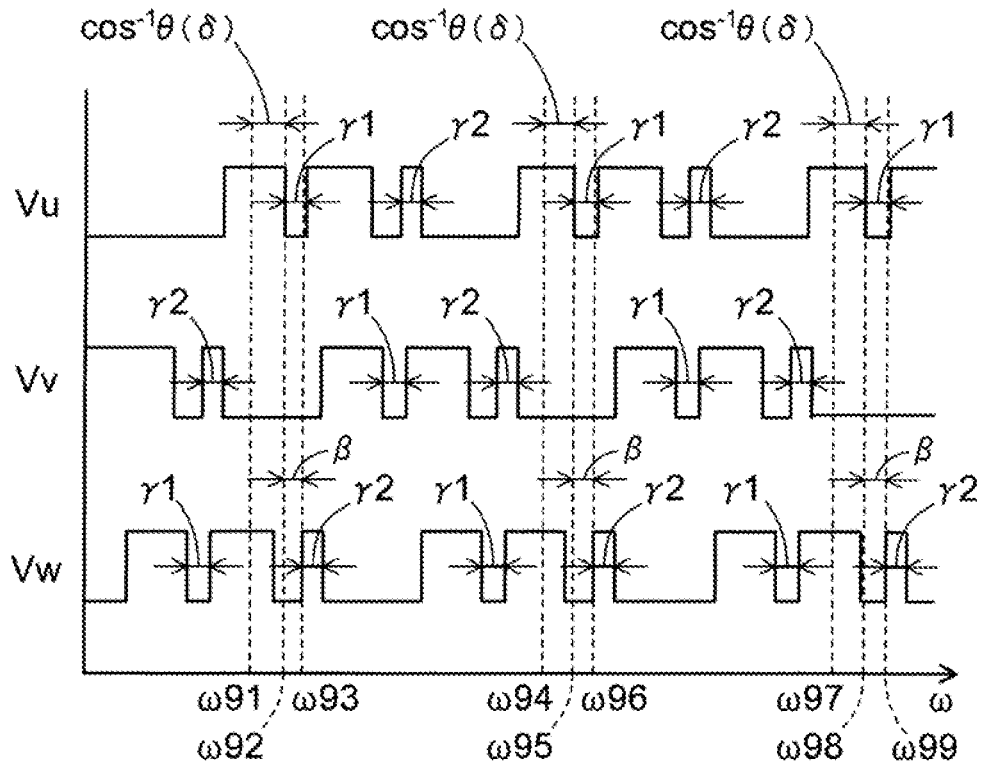
FIG. 17 is a schematic view illustrating a fourth example of controlling the ON/OFF states of each phase by the control unit.

FIGS. 16 and 17 show examples of the control signals transmitted from the control unit 70 to the drive unit 60. The control signals shown in FIGS. 16 and 17 cause current pulse pairs to be generated with one of the three phases being the first phase and the remaining two phases being the second and third phases.

FIG. 16 shows the same control example as FIG. 15. In this example, the start timings of temporary OFF durations γ1 and the start timings of corresponding temporary ON durations γ2 are set to the same timings. Similar to the lengths of the temporary ON durations α1 and temporary OFF durations α2, the lengths of the temporary OFF durations γ1 and temporary ON durations γ2 are preferably 0.5-10% of the cycle of the fundamental waves.

In the case of the first phase being the U phase, reference times Su are respectively set to electrical angles ω81, ω87 and ω8d that are respectively the centers of OFF durations Voff of the U-phase voltage Vu. Electrical angles ω82, ω88 and ω8e are delayed from the respective reference times Su by $\cos^{-1}\theta$ in electrical angle. From electrical angles ω82, ω88 and ω8e, the W-phase voltage Vw that is of the second phase is turned OFF for temporary OFF durations γ1 and the V-phase voltage Vv that is of the third phase is turned ON for temporary ON durations γ2.

In the case of the first phase being the V phase, reference times Sv are respectively set to electrical angles ω83 and ω89 that are respectively the centers of OFF durations Voff of the V-phase voltage Vv. Electrical angles ω84 and ω8a are delayed from the respective reference times Sv by $\cos^{-1}\theta$ in electrical angle. From electrical angles ω84 and ω8a, the U-phase voltage Vu that is of the second phase is turned OFF for temporary OFF durations γ1 and the W-phase voltage Vw that is of the third phase is turned ON for temporary ON durations γ2.

In the case of the first phase being the W phase, reference times Sw are respectively set to electrical angles ω8$5 and ω8$b$ that are respectively the centers of OFF durations Voff of the W-phase voltage Vw. Electrical angles ω86 and ω8$c$ are delayed from the respective reference times Sw by $\cos^{-1} \theta$ in electrical angle. From electrical angles ω86 and ω8$c$, the V-phase voltage Vv that is of the second phase is turned OFF for temporary OFF durations γ1 and the U-phase voltage Vu that is of the third phase is turned ON for temporary ON durations γ2.

FIG. 17 shows a different control example from FIG. 15. In this example, temporary ON durations γ2 are delayed from corresponding temporary OFF durations γ1 by delay periods β. In FIG. 17, there is illustrated the case of the first phase being the V phase. In this case, reference times Sv are respectively set to electrical angles ω91, ω94 and ω97 that are respectively the centers of OFF durations Voff of the V-phase voltage Vv. Electrical angles ω92, ω95 and ω98 are delayed from the respective reference times Sv by $\cos^{-1} \theta$ in electrical angle. From electrical angles ω92, ω95 and ω98, the U-phase voltage Vu that is of the second phase is turned OFF for temporary OFF durations γ1.

Further, electrical angles ω93, ω96 and ω99 are respectively delayed from electrical angles ω92, ω95 and ω98 by the delay periods β. From electrical angles ω93, ω96 and ω99, the W-phase voltage Vw that is of the third phase is turned ON for temporary ON durations γ2. That is, the start timings of the temporary ON durations γ2 are delayed from the respective reference times Sv by $(\cos^{-1} \theta + \beta)$ in electrical angle.

Moreover, in the case of the first phase being the U phase, the W-phase voltage Vw that is of the second phase is turned OFF for temporary OFF durations γ1 that are respectively delayed from the centers of OFF durations Voff of the U-phase voltage Vu by $\cos^{-1} \theta$ in electrical angle; further, the V-phase voltage Vv that is of the third phase is turned ON for temporary ON durations γ2 that are respectively delayed from the corresponding temporary OFF durations γ1 of the W-phase voltage Vw by delay periods β. Furthermore, in the case of the first phase being the W phase, the V-phase voltage Vv that is of the second phase is turned OFF for temporary OFF durations γ1 that are respectively delayed from the centers of OFF durations Voff of the W-phase voltage Vw by $\cos^{-1} \theta$ in electrical angle; further, the U-phase voltage Vu that is of the third phase is turned ON for temporary ON durations γ2 that are respectively delayed from the corresponding temporary OFF durations γ1 of the V-phase voltage Vv by delay periods β.

In addition, though the case of providing the delay periods β for the third phase is described above, it can be similarly applied to the opposite case. That is, in the case of the first phase being the V phase, the W-phase voltage Vw that is of the third phase is turned ON for temporary ON durations 72 that are respectively delayed from the centers of OFF durations Voff of the V-phase voltage Vv by $\cos^{-1} \theta$ in electrical angle; further, the U-phase voltage Vu that is of the second phase is turned OFF for temporary OFF durations γ1 that are respectively delayed from the corresponding temporary ON durations γ2 of the W-phase voltage Vw by delay periods β.

Moreover, in the case of the first phase being the U phase, the V-phase voltage Vv that is of the third phase is turned ON for temporary ON durations 72 that are respectively delayed from the centers of OFF durations Voff of the U-phase voltage Vu by $\cos^{-1} \theta$ in electrical angle; further, the W-phase voltage Vw that is of the second phase is turned OFF for temporary OFF durations γ1 that are respectively delayed from the corresponding temporary ON durations γ2 of the V-phase voltage Vv by delay periods β.

Furthermore, in the case of the first phase being the W phase, the U-phase voltage Vu that is of the third phase is turned ON for temporary ON durations 72 that are respectively delayed from the centers of OFF durations Voff of the W-phase voltage Vw by $\cos^{-1} \theta$ in electrical angle; further, the V-phase voltage Vv that is of the second phase is turned OFF for temporary OFF durations 71 that are respectively delayed from the corresponding temporary ON durations γ2 of the U-phase voltage Vu by delay periods β.

C. Examples of Setting Reference Times to the Centers of ON Durations and OFF Durations of the First Phase Next, referring to FIGS. 18 and 19, examples will be described where reference times are set to the centers of ON durations and OFF durations of the control signal (specifically, the pulse signal) for driving the switching elements Q of the first phase. Simply put, these examples are combinations of the above-described "A. Examples of setting reference times to the centers of ON durations of the first phase" and "B. Examples of setting reference times to the centers of OFF durations of the first phase". Hereinafter, the case of the first phase being the V phase will be described. However, since it is preferable for the three phases to be balanced, the process performed in the case of the first phase being the V phase is similarly performed in the case of the first phase being the U phase and in the case of the first phase being the W phase.

Figure 18:
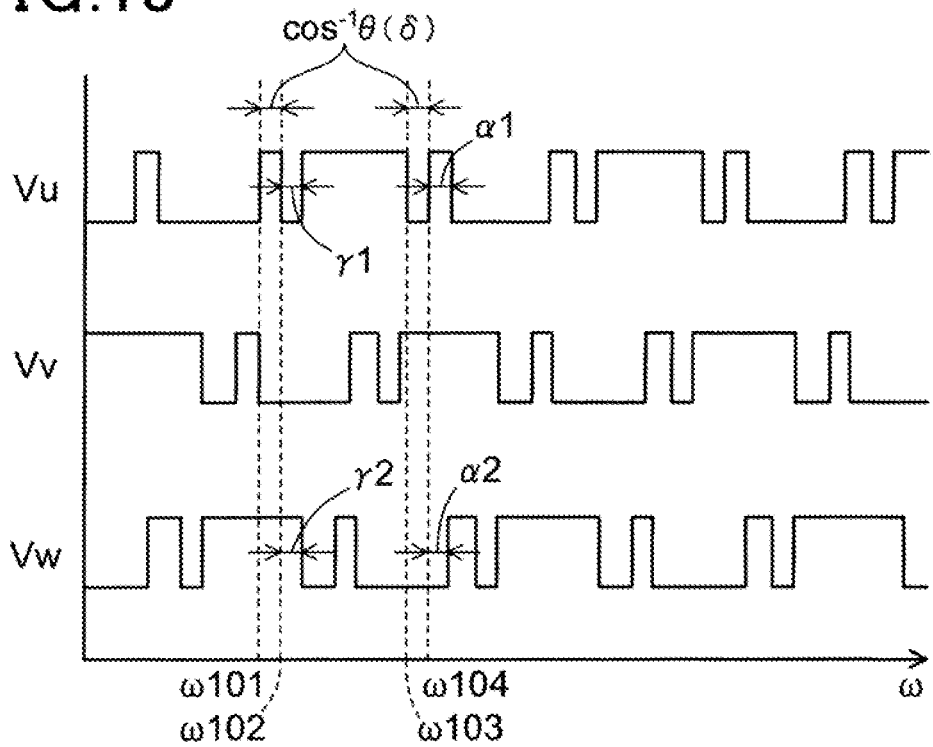
FIG. 18 is a schematic view illustrating a fifth example of controlling the ON/OFF states of each phase by the control unit.

In FIG. 18, reference times Sv are respectively set to electrical angle ω103 that is the center of an ON duration Von of the V-phase voltage Vv and electrical angle ω101 that is the center of an OFF duration Voff of the V-phase voltage Vv. Temporary ON durations α1 and γ2 and temporary OFF durations α2 and γ1 are delayed from the respective reference times Sv by $\cos^{-1} \theta$ in electrical angle.

Electrical angle ω104 is delayed by $\cos^{-1} \theta$ in electrical angle from the reference time Sv that is the center of an ON duration Von. From electrical angle ω104, the U-phase voltage Vu that is of the second phase is turned ON for a temporary ON duration α1 and the W-phase voltage Vw that is of the third phase is turned OFF for a temporary OFF duration α2.

Electrical angle ω102 is delayed by $\cos^{-1} \theta$ in electrical angle from the reference time Sv that is the center of an OFF duration Voff. From electrical angle ω102, the U-phase voltage Vu that is of the second phase is turned OFF for a temporary OFF duration γ1 and the W-phase voltage Vw that is of the third phase is turned ON for a temporary ON duration γ2.

Figure 19:
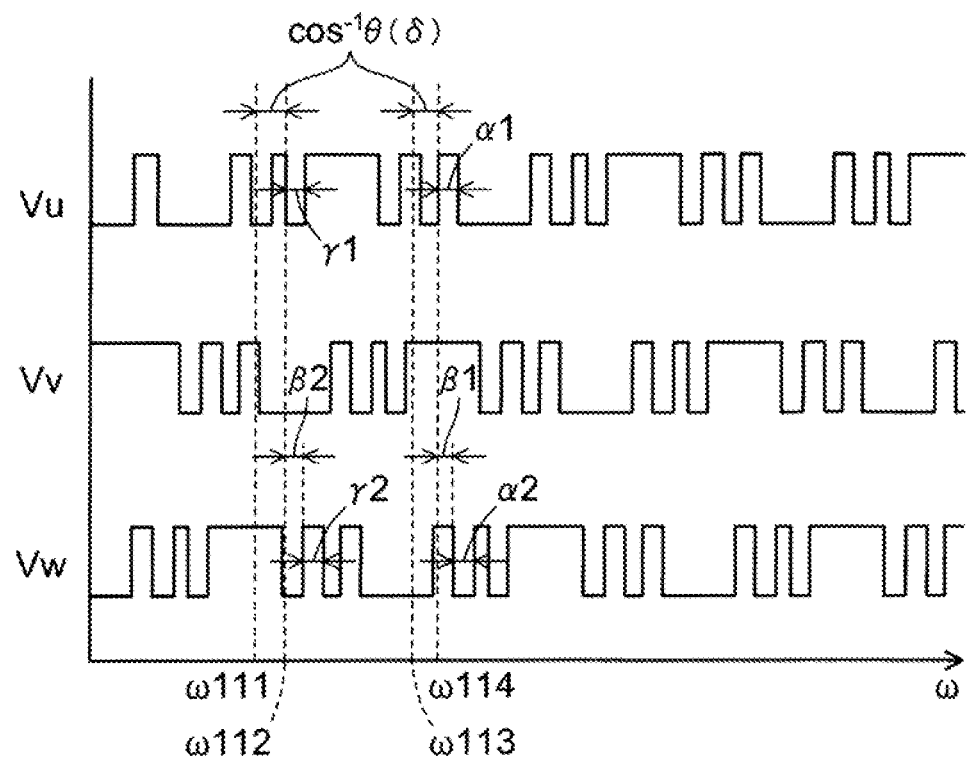
FIG. 19 is a schematic view illustrating a sixth example of controlling the ON/OFF states of each phase by the control unit.

FIG. 19 shows a different control example from FIG. 18. In this example, the third phase is delayed from the second phase. Specifically, temporary OFF durations α2 are respectively delayed from corresponding temporary ON durations α1 by delay periods β1; temporary ON durations γ2 are respectively delayed from corresponding temporary OFF durations γ1 by delay periods β2. This example is the same as the control example shown in FIG. 18 in that the second phase is delayed from the reference times Sv of the first phase by $\cos^{-1} \theta$ in electrical angle.

In FIG. 19, reference times Sv are respectively set to electrical angle ω113 that is the center of an ON duration Von of the V-phase voltage Vv and electrical angle ω111 that is the center of an OFF duration Voff of the V-phase voltage Vv.

Electrical angle ω114 is delayed by $\cos^{-1} \theta$ in electrical angle from the reference time Sv that is the center of an ON duration Von. From electrical angle 114, the U-phase voltage Vu that is of the second phase is turned ON for a temporary ON duration α1. Further, the W-phase voltage Vw that is of the third phase is turned OFF for a temporary OFF duration α2 that is delayed from electrical angle ω114 by a delay period β1.

Electrical angle ω112 is delayed by $\cos^{-1} \theta$ in electrical angle from the reference time Sv that is the center of an OFF duration Voff. From electrical angle ω112, the U-phase voltage Vu that is of the second phase is turned OFF for a temporary OFF duration γ1. Further, the W-phase voltage Vw that is of the third phase is turned ON for a temporary ON duration 72 that is delayed from electrical angle ω112 by a delay period β2.

In addition, though the case of providing the delay periods β1 and β2 for the third phase is described above, it can be similarly applied to the opposite case, i.e., to the case of the second phase being delayed from the third phase.

In the control examples shown in FIGS. 18 and 19, it is possible to generate, with respect to each of the three phases, the pair of a positive voltage pulse (i.e., temporary ON duration α1, γ2) and a negative voltage pulse (i.e., temporary OFF duration α2, γ1) twice during each cycle consisting of an ON duration Von and an OFF duration Voff. The generation of each current pulse pair contributes to improvement of the torque τ as shown in FIG. 10. Therefore, the generation of two current pulse pairs can further improve the torque τ.

In the above-described embodiment, the predetermine angle is equal to $\cos^{-1} \theta$ in electrical angle. Alternatively, it may be possible that $\cos^{-1} \theta - 30° \leq \delta \leq \cos^{-1} \theta + 30°$, where δ is the predetermined angle in electrical angle. By delaying the second phase or the third phase within this range, it is still possible to generate current pulse pairs as shown in FIG. 8. That is, it is possible to generate voltage pulse pairs, which induce current pulse pairs, in the second phase and the third phase at timings delayed by the predetermined angle δ from respective reference times of the first phase in which fundamental current flows.

According to the above-described first embodiment, it is possible to achieve the following operational effects.

(1) The field winding type rotating electric machine M includes the stator 10, the rotor 20 with the field winding 21, the rectifying element D1, the driver 60 that includes the switching elements Q, and the controller 70. The controller 70 is configured to generate, when performing the rectangular-wave energization, the voltage pulse pairs, which induce the current pulse pairs, by: setting the reference times respectively to the centers of the ON durations or OFF durations of the control signal of the first phase; and providing the temporary ON durations α1, γ2 and the temporary OFF durations α2, γ1 after the predetermined angle δ, which includes $\cos^{-1} \theta$ in electrical angle, from the respective reference times. The temporary ON durations α1, γ2 are provided to temporarily turn ON the control signals of the second phase and the third phase during the OFF durations of the control signals. The temporary OFF durations α2, γ1 are provided to temporarily turn OFF the control signals of the third phase and the second phase during the ON durations of the control signals. With the above configuration, the voltage pulse pairs, which induce the current pulse pairs, are generated in the second phase and the third phase after the predetermined angle δ from the respective reference times of the first phase in which the fundamental current flows. Consequently, it becomes possible to generate the excitation magnetic flux in the stator windings 12 by the induced current pulse pairs, thereby exciting the field winding 21 with a significant difference provided by the second and third phases. As a result, it becomes possible to excite, when performing the rectangular-wave energization, the field winding 21 from the stator windings 12, thereby further improving the performance.

(2) The lengths of the temporary ON durations α1, γ2 and the lengths of the temporary OFF durations α2, γ1 are each set to be 0.5-10% of one cycle of the control signal of the first phase. With this configuration, it is possible to reliably excite the field winding 21 without significantly affecting the fundamental current flowing in the stator winding 12 of the first phase.

(3) The predetermined angle δ is set to satisfy $\cos^{-1} \theta - 30° \leq \delta \leq \cos^{-1} \theta + 30°$. Generating the voltage pulse pairs with the predetermined angle δ in this range, it is possible to reliably generate the current pulse pairs when performing the rectangular-wave energization or the overmodulation energization.

(4) The start timing of one of a corresponding pair of the temporary ON durations α1, γ2 and the temporary OFF durations α2, γ1 is delayed from the start timing of the other of the corresponding pair of the temporary ON durations α1, γ2 and the temporary OFF durations α2, γ1 by the delay period β1, β2. With this configuration, it is possible to generate the current pulse pairs having a significant difference with respect to the fundamental current flowing in the stator winding 12 of the first phase. Consequently, it becomes possible to excite, when performing the rectangular-wave energization, the field winding 21 from the stator windings 12, thereby further improving the performance.

(5) The controller 70 is configured to generate, with respect to each of the three phases, the pair of a positive voltage pulse (i.e., temporary ON duration α1, γ2) and a negative voltage pulse (i.e., temporary OFF duration α2, γ1) once or twice during each cycle consisting of an ON duration Von and an OFF duration Voff. With this configuration, it is possible to adjust, by selecting the number of times of generation of the voltage pulse pair to be once or twice, the amount of the excitation magnetic flux, which excites the field winding 21, or the amount of the field current according to the rotational speed of the rotor 20.

Second Embodiment

The second embodiment will be described with reference to FIGS. 20-22. In addition, for the sake of simplifying description and graphical illustration, unless specified otherwise, components identical to those in the first embodiment are marked with the same reference numerals and description thereof is omitted. Accordingly, the differences of the second embodiment from the first embodiment will be mainly described hereinafter.

Figure 20:
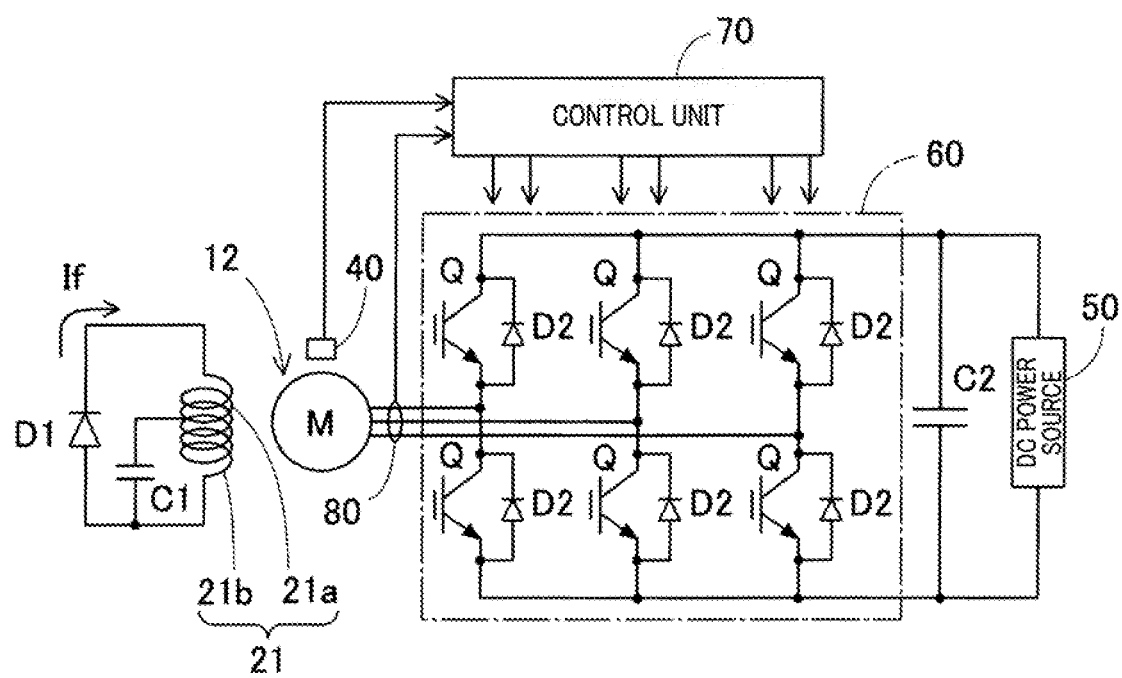
FIG. 20 is a schematic view illustrating a second configuration example of the field winding type rotating electric machine.

FIG. 20 shows a configuration example which is an alternative to the configuration example of the first embodiment shown in FIG. 3 and which is also designed to control drive of a filed winding type rotating electric machine M. This configuration example differs from the configuration example shown in FIG. 3 in that the field circuit further includes a capacitive element C1: and the field winding 21 is divided into field windings 21a and 21b. Control signals outputted from the control unit 70 to the drive unit 60 are identical to those in the first embodiment; therefore, description and graphical illustration thereof are omitted hereinafter.

The capacitive element C1 has one end connected between the two ends of the field winding 21 and the other end connected to a terminal (specifically, anode terminal) of the rectifying element D1. To connect one end of the capacitive element C1 between the two ends of the field winding 21, it is necessary to divide the field winding 21 into two parts; therefore, the field winding 21 consists of the field windings 21a and 21b. That is, one end of the capacitive element C1 is connected between the field windings 21a and 21b.

Figure 21:
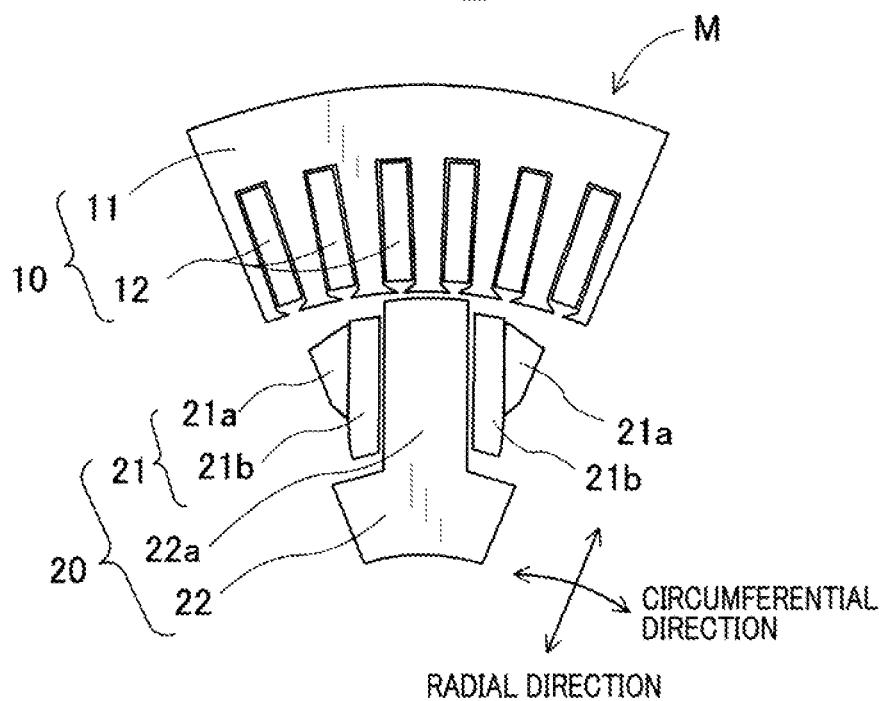
FIG. 21 is a radial cross-sectional view partially illustrating a second configuration example of the stator and the rotor.
Figure 22:
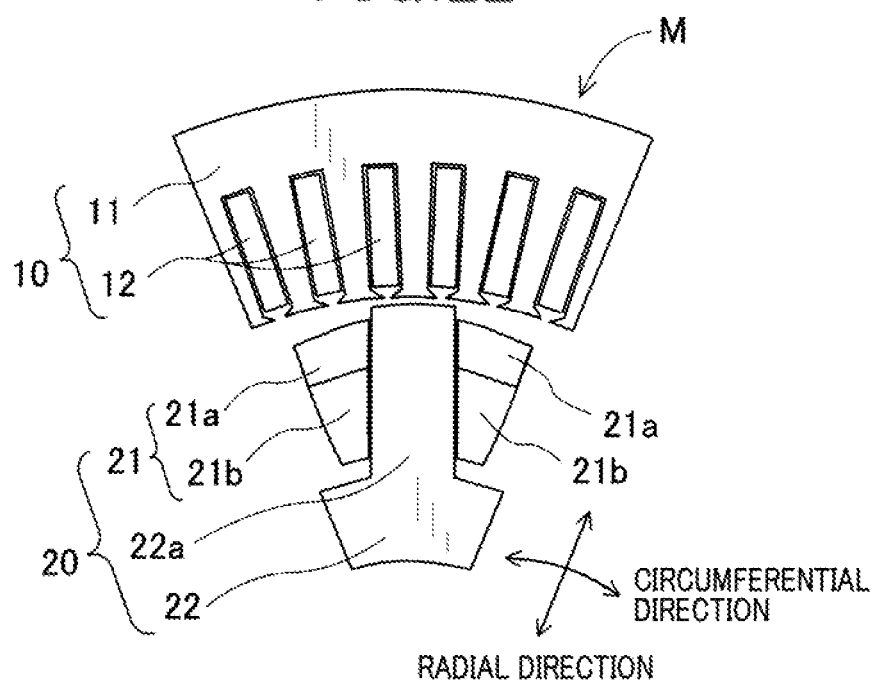
FIG. 22 is a radial cross-sectional view partially illustrating a third configuration example of the stator and the rotor.

FIGS. 21 and 22 show configuration examples of the field windings 21a and 21b. In the configuration example shown in FIG. 21, the field winding 21b is concentratedly wound on the main magnetic pole portions 22a of the rotor core 22; further, the field winding 21a is concentratedly wound on the outside of the field winding 21b. In addition, though not shown in the figures, the field winding 21a may be concentratedly wound on the main magnetic pole portions 22a; further, the field winding 21b may be concentratedly wound on the outside of the field winding 21a.

In the configuration example shown in FIG. 22, the field windings 21a and 21b are concentratedly wound on the main magnetic pole portions 22a of the rotor core 22 so as to be radially offset from each other. Specifically, the field winding 21a is concentratedly wound on the main magnetic pole portions 22a so as to be located on the radially outer side (i.e., the side closer to the stator 10) while the field winding 21b is concentratedly wound on the main magnetic pole portions 22a so as to be located on the radially inner side (i.e., the side further from the stator 10). In addition, though not shown in the figures, the field winding 21b may be concentratedly wound on the main magnetic pole portions 22a so as to be located on the radially outer side while the field winding 21a may be concentratedly wound on the main magnetic pole portions 22a so as to be located on the radially inner side.

Moreover, though not shown in the figures, as an alternative to the configuration examples shown in FIGS. 21 and 22, the field windings 21a and 21b may be concentratedly wound, by two-wire winding, on the main magnetic pole portions 22a of the rotor core 22. The two-wire winding is a method of bundling the field windings 21a and 21b together and then winding them on the main magnetic pole portions 22.

According to the above-described second embodiment, it is possible to achieve the following operational effect in addition to the same operational effects as achievable according to the first embodiment.

(6) The field winding 21 is concentratedly wound on each pole (i.e., each main magnetic pole portion 22a). The field circuit includes the capacitive element C1 that has one connected between the two ends of the field winding 21 and the other end connected to a terminal of the rectifying element D1. With this configuration, it is possible to store in the capacitive element C1 electric charge corresponding to a voltage canceled by electric currents flowing in the field windings 21a and 21b that together constitute the field winding 21 and discharge and effectively utilize the electric charge upon the directions of the electric currents being changed.

Third Embodiment

The third embodiment will be described with reference to FIGS. 23-26. In addition, for the sake of simplifying description and graphical illustration, unless specified otherwise, components identical to those in the first and second embodiments are marked with the same reference numerals and description thereof is omitted. Accordingly, the differences of the third embodiment from the first and second embodiments will be mainly described hereinafter.

Figure 23:
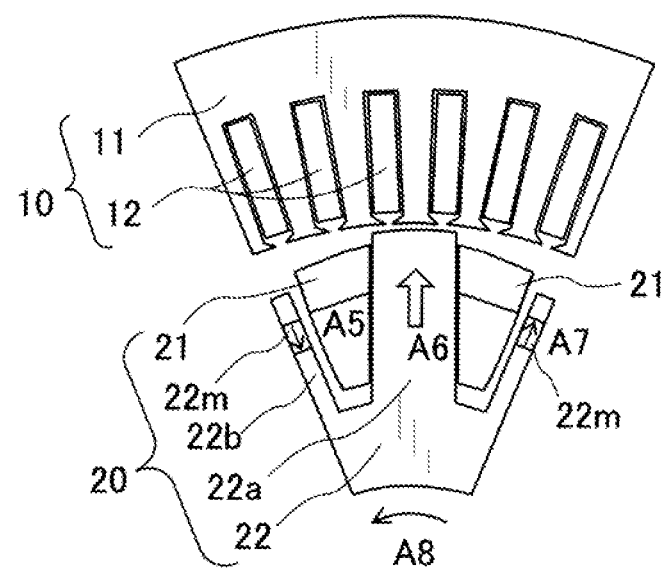
FIG. 23 is a radial cross-sectional view partially illustrating a fourth configuration example of the stator and the rotor.
Figure 24:
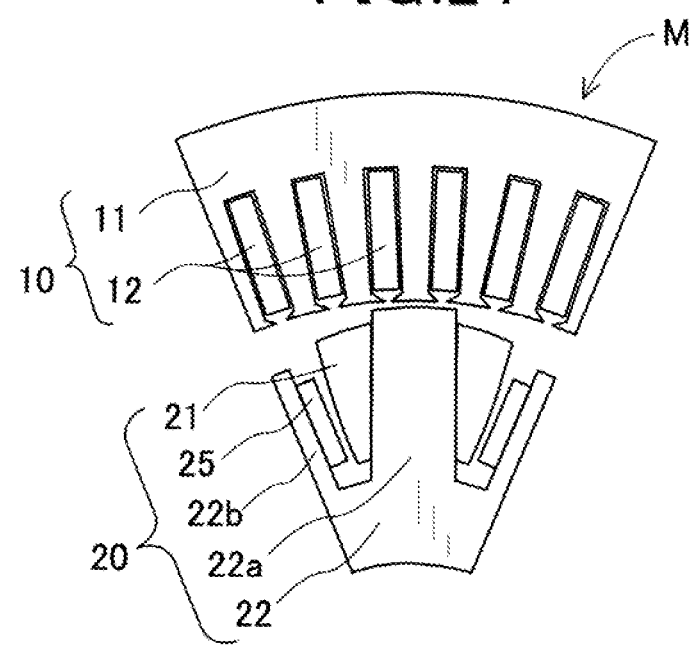
FIG. 24 is a radial cross-sectional view partially illustrating a fifth configuration example of the stator and the rotor.

FIGS. 23 and 24 show configuration examples of the rotor 20 which are alternatives to the configuration example of the rotor 20 of the first embodiment shown in FIG. 2. These configuration examples differ from the configuration example shown in FIG. 2 in that the rotor core 22 has, in addition to the plurality of main magnetic pole portions 22a provided as the first convex portions, a plurality of auxiliary magnetic pole portions 22b provided as second convex portions. Since the main magnetic pole portions 22a function as magnetic poles, the main magnetic pole portions 22a and the auxiliary magnetic pole portions 22b are provided alternately in the circumferential direction. The auxiliary magnetic pole portions 22b are also referred to as "sub-poles" or "auxiliary poles".

The auxiliary magnetic pole portions 22b are provided to be narrower in the circumferential direction than the main magnetic pole portions 22a. The auxiliary magnetic pole portions 22b have magnets provided therein, thereby suppressing magnetic flux leaking between the poles. The magnets may be either permanent magnets or electromagnets formed with windings.

Specifically, in the configuration example shown in FIG. 23, the auxiliary magnetic pole portions 22b have respective permanent magnets 22m provided therein. In FIG. 23, the rotor 20 rotates in the direction of an arrow A8; one of the main magnetic pole portions 22a is magnetized in the direction of an arrow A6 to form an N pole. In this case, the permanent magnet 22m provided in the auxiliary magnetic pole portion 22b on one side (i.e., the left side in FIG. 23) of the main magnetic pole portion 22a is magnetized in the direction of an arrow A5 while the permanent magnet 22m provided in the auxiliary magnetic pole portion 22b on the other side (i.e., the right side in FIG. 23) of the main magnetic pole portion 22a is magnetized in the direction of an arrow A7. In addition, though not shown in the figures, in the case of one of the main magnetic pole portions 22a forming an S pole, the main magnetic pole portion 22a and the two auxiliary magnetic pole portions 22b respectively on opposite sides of the main magnetic pole portion 22a are magnetized in directions opposite to those shown in FIG. 23. In short, the two auxiliary magnetic pole portions 22b adjacent to the main magnetic pole portion 22a have opposite polarities to each other.

In the configuration example shown in FIG. 24, the auxiliary magnetic pole portions 22b have respective auxiliary-magnetic-pole windings 25 wound thereon. Upon electric currents being induced by the magnetic fluxes from the stator 10 to flow in the auxiliary-magnetic-pole windings 25, the auxiliary magnetic pole portions 22b are magnetized according to the directions of winding the auxiliary-magnetic-pole windings 25. For each of the main magnetic pole portions 22a, the directions of winding the auxiliary-magnetic-pole windings 25 are opposite to each other at the two auxiliary magnetic pole portions 22b adjacent to the main magnetic pole portion 22a. Consequently, the polarities of the two auxiliary magnetic pole portions 22b become opposite to each other.

Figure 25:
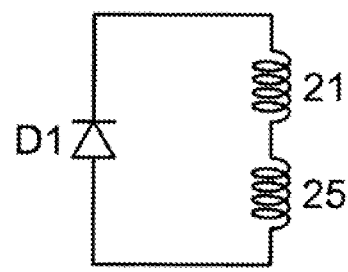
FIG. 25 is a schematic view illustrating a field circuit including the field winding and an auxiliary-magnetic-pole winding.
Figure 26:
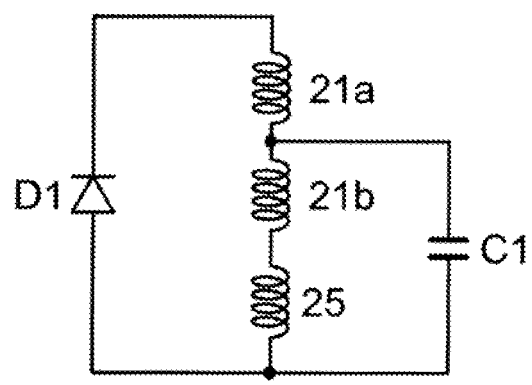
FIG. 26 is a schematic view illustrating a field circuit including the field winding, an auxiliary-magnetic-pole winding and a capacitive element.

FIGS. 25 and 26 show field circuits which respectively correspond to different configuration examples of the field winding 21 in the rotor 20 having the auxiliary-magnetic-pole windings 25. In the field circuit shown in FIG. 25, the field winding 21, the auxiliary-magnetic-pole windings 25 and the rectifying element D1 are connected in series with each other. In the field circuit shown in FIG. 26, the field windings 21a and 21b, the auxiliary-magnetic-pole windings 25 and the rectifying element D1 are connected in series with each other, the capacitive element C1 is connected in parallel to the serially-connected field winding 21b and the auxiliary-magnetic-pole windings 25. Specifically, the capacitive element C1 has one end connected between the two ends of the field winding 21 (specifically, between the field windings 21a and 21b) and the other end connected to a terminal (specifically, anode terminal) of the rectifying element D1. The rectifying element D1 restricts the directions of electric currents flowing in the field winding 21 and the auxiliary-magnetic-pole windings 25, thereby restricting the polarities of the main magnetic pole portions 22a and the auxiliary magnetic pole portions 22b. Moreover, with the capacitive element C1 shown in FIG. 26, it is possible to store in the capacitive element C electric charge corresponding to the voltage canceled by the electric currents flowing in the field windings 21a and 21b and discharge and effectively utilize the electric charge upon the directions of the electric currents being changed.

According to the above-described third embodiment, it is possible to achieve the following operational effect in addition to the same operational effects as achievable according to the first embodiment.

(7) The rotor 20 includes the main magnetic pole portions 22a that are the first convex portions of the rotor core 22 facing the stator 10 and the auxiliary magnetic pole portions 22b that are the second convex portions having a narrower circumferential width than the first convex portions. The auxiliary magnetic pole portions 22b have the respective magnets (i.e., permanent magnets 22m or auxiliary-magnetic-pole windings 25) magnetized in directions canceling the magnetic fields of the stator 10. Though magnetic flux generated by the rotating magnetic field of the stator 10 mostly flows through the main magnetic pole portions 22a, there are also leakage magnetic fluxes. Therefore, the amount and direction of magnetic flux passing through the field winding 21 vary depending on the position of the field winding 21. With the above configuration, it is possible to form inter-pole boundaries with the auxiliary magnetic pole portions 22b; thus it is possible for the magnets to suppress magnetic flux leaking between the poles. Consequently, it is possible to cause magnetic flux to efficiently flow inside the poles, thereby effectively obtaining the field current If.

Fourth Embodiment

The fourth embodiment will be described with reference to FIGS. 27-29. In addition, for the sake of simplifying description and graphical illustration, unless specified otherwise, components identical to those in the first to the third embodiments are marked with the same reference numerals and description thereof is omitted. Accordingly, the differences of the fourth embodiment from the first to the third embodiments will be mainly described hereinafter.

Figure 27:
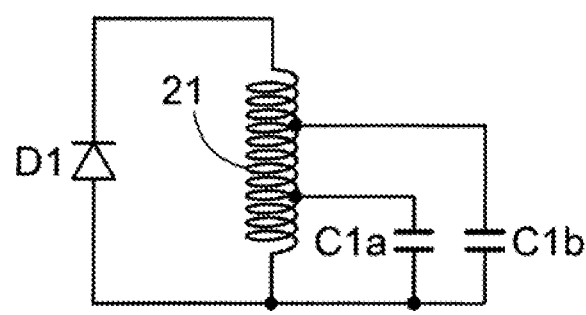
FIG. 27 is a schematic view illustrating a field circuit including the field winding, an auxiliary-magnetic-pole winding and a plurality of capacitive elements.

FIG. 27 shows a field circuit that is an alternative to the field circuit of the first embodiment shown in FIG. 3. This field circuit differs from the field circuit shown in FIG. 3 in that: the field circuit further includes capacitive elements C1a and C1b; and the field winding 21 is divided into field windings 21a, 21b and 21c. Control signals outputted from the control unit 70 to the drive unit 60 are identical to those in the first embodiment; therefore, description and graphical illustration thereof are omitted hereinafter.

Each of the capacitive elements C1a and C1b has one end connected between the two ends of the field winding 21 and the other end connected to a terminal (specifically, anode terminal) of the rectifying element D1. To connect one end of each of the capacitive elements C1a and C1b between the two ends of the field winding 21, it is necessary to divide the field winding 21 into three parts; therefore, the field winding 21 consists of the field windings 21a, 21b and 21c. That is, one end of the capacitive element C1a is connected between the field windings 21a and 21b and one end of the capacitive element C1b is connected between the field windings 21b and 21c.

Figure 28:
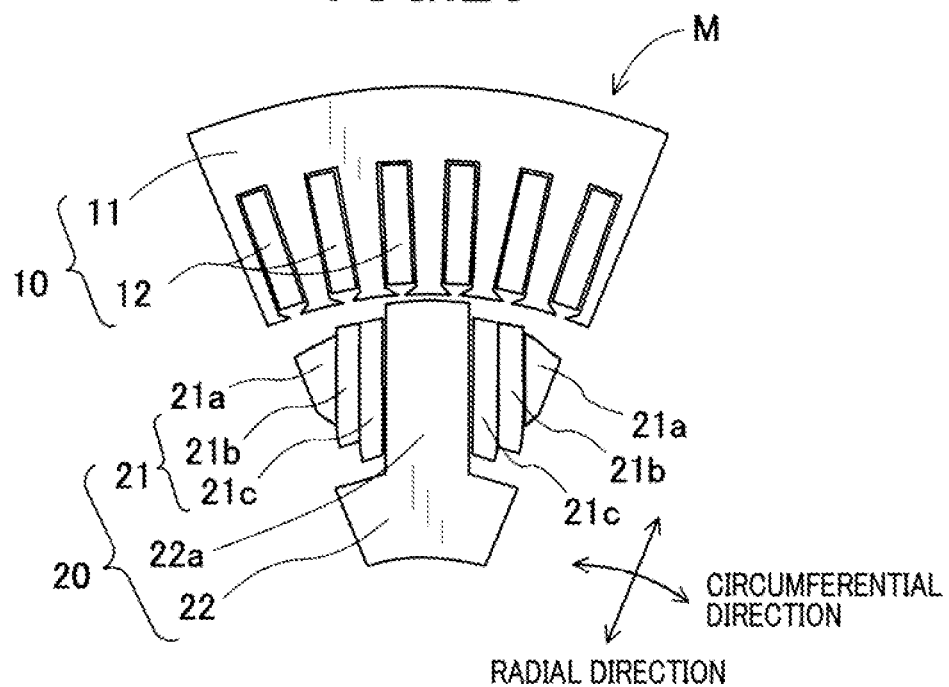
FIG. 28 is a radial cross-sectional view partially illustrating a sixth configuration example of the stator and the rotor.
Figure 29:
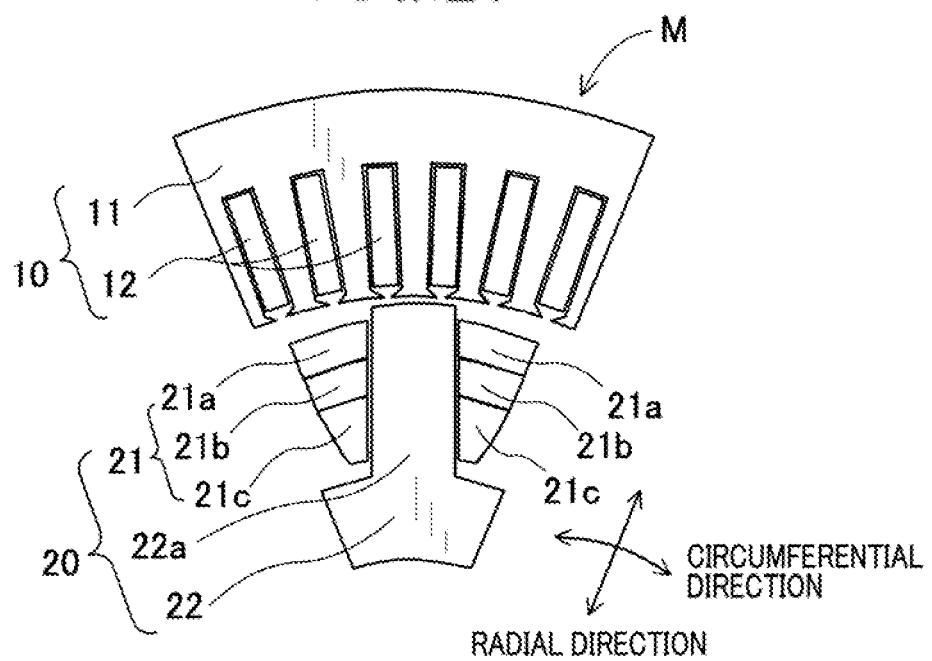
FIG. 29 is a radial cross-sectional view partially illustrating a seventh configuration example of the stator and the rotor.

FIGS. 28 and 29 show configuration examples of the field windings 21a, 21b and 21c. In the configuration example shown in FIG. 28, the field windings 21a, 21b and 21c are concentratedly wound on the main magnetic pole portions 22a of the rotor core 22 so as to be located in this order from the outside to the inside of each of the main magnetic pole portions 22a. In addition, the order of locating the field windings 21a, 21b and 21c from the outside to the inside of each of the main magnetic pole portions 22a is not limited to that shown FIG. 28; the field windings 21a, 21b and 21c may be located from the outside to the inside of each of the main magnetic pole portions 22a in different orders.

In the configuration example shown in FIG. 29, the field windings 21a, 21b and 21c are concentratedly wound on the main magnetic pole portions 22a of the rotor core 22 so as to be radially offset from each other. Specifically, the field windings 21a, 21b and 21c are concentratedly wound on the main magnetic pole portions 22a so as to be located in this order from the radially outer side (i.e., the side closer to the stator 10) to the radially inner side (i.e., the side further from the stator 10). In addition, though not shown in the figures, the field winding 21b may be concentratedly wound on the main magnetic pole portions 22a so as to be located on the radially outer side while the field winding 21a may be concentratedly wound on the main magnetic pole portions 22a so as to be located on the radially inner side. In addition, the order of locating the field windings 21a, 21b and 21c from the radially outer side to the radially inner side is not limited to that shown FIG. 29; the field windings 21a, 21b and 21c may be located from the radially outer side to the radially inner side in different orders.

Moreover, though not shown in the figures, as an alternative to the configuration examples shown in FIGS. 28 and 29, the field windings 21a, 21b and 21c may be concentratedly wound, by three-wire winding, on the main magnetic pole portions 22a of the rotor core 22. The three-wire winding is a method of bundling the field windings 21a, 21b and 21c together and then winding them on the main magnetic pole portions 22.

According to the fourth embodiment, it is possible to achieve the same operational effects as achievable according to the second embodiment.

While the above particular embodiments have been shown and described, it will be understood by those skilled in the art that various modifications, changes, and improvements may be made without departing from the spirit of the invention.

In the above-described embodiments, the current pulse pairs are induced when performing the rectangular-wave energization. As an alternative, current pulse pairs may be induced when performing overmodulation energization (i.e., $1 \leq m < 1.27$ in a normal control or $1.15 \leq m < 1.27$ in a specific control). The overmodulation energization differs from the rectangular-wave energization only in the modulation factor m and the modulation mode. By inducing current pulse pairs when performing the overmodulation energization, it is possible to achieve the same operational effects as achievable according to the first to the fourth embodiments.

In the above-described embodiments, the number of the main magnetic pole portions 22a of the rotor 20 is set to 8. As an alternative, the number of the main magnetic pole portions 22a may be set to any different number greater than or equal to 2 to the extent that the main magnetic pole portions 22a can be formed in the rotor 20. That is, the number of the main magnetic pole portions 22a can be set according to the functions and ratings of the field winding type rotating electric machine M. Since only the number of the poles is different, it is still possible to achieve the same operational effects as achievable according to the first to the fourth embodiments.

In the above-described embodiments, the DC power source 50 is implemented by a secondary battery. As an alternative, the DC power source 50 may be implemented by a primary battery or a combination of a secondary battery and a primary battery provided that it can supply the required electric power. As another alternative, the DC power source 50 may be configured to switch between a secondary battery and a primary battery according to the required electric power. The primary battery may be, for example, solar cells, fuel cells or metal-air cells. Since only the source of electric power supply is different, it is still possible to achieve the same operational effects as achievable according to the first to the fourth embodiments.

In the above-described embodiments, the external device is an ECU. As an alternative, the external device may be a computer or a processing device that is provided in or outside a vehicle and connected to the control unit 70 via an internal or external communication line. As another alternative, no external device is connected to the control unit 70; the control unit 70 may store therein information corresponding to the command signals and output the control signals without relying on any external device. Since only the configuration of the external device or the presence or absence of the command signals is different, it is still possible to achieve the same operational effects as achievable according to the first to the fourth embodiments.

In the above-described embodiments, the field winding type rotating electric machine M is of an inner rotor type having the stator 10 arranged radially outer side and the rotor 20 arranged radially inner side. As an alternative, the field winding type rotating electric machine M may be of an outer rotor type having the stator 10 arranged radially inner side and the rotor 20 arranged radially outer side. Since only the arrangement of the stator 10 and the rotor 20 is different, it is still possible to achieve the same operational effects as achievable according to the first to the fourth embodiments.

In the above-described embodiments, the plurality of phases of the stator windings 12 are the three phases of U, V and W; the manner of winding the stator windings 12 is distributed winding. As an alternative, the plurality of phases of the stator windings 12 may be three phases having different names (e.g., X, Y and Z or A, B and C) or four or more phases to the extent that the stator windings 12 can be provided in the stator 10. In the case of the number of phases of the stator windings 12 being greater than or equal to 4, one of all the phases (to be referred to as "reference phase" hereinafter) may constitute the "first phase" and two of the remaining phases may respectively constitute the "second phase" and the "third phase" or all of the phases other than the reference phase may respectively constitute the "second phase", the "third phase", the "fourth phase" and so on. That is, current pulse pairs may be generated in two or more phases. Moreover, the stator windings 12 may be wound in other manners than distributed winding, such as full-pitch winding, concentrated winding or short-pitch winding. Since only the names, the number of phases and/or the manner of winding are different, it is still possible to achieve the same operational effects as achievable according to the first to the fourth embodiments.

In the control example of the first embodiment shown in FIG. 12, the second phase is turned ON for temporary ON durations $\alpha 1$ that are delayed from the respective reference times of the first phase by $\cos^{-1} \theta$ in electrical angle; the third phase is turned OFF for temporary OFF durations $\alpha 2$ that are further delayed by the delay periods $\beta$ than the corresponding ON durations $\alpha 1$ of the second phase. Similarly, in the control example of the first embodiment shown in FIG. 17, the second phase is turned OFF for temporary OFF durations $\gamma 1$ that are delayed from the respective reference times of the first phase by $\cos^{-1} \theta$ in electrical angle; the third phase is turned ON for temporary ON durations $\gamma 2$ that are further delayed by the delay periods $\beta$ than the corresponding temporary OFF durations $\gamma 1$ of the second phase. As alternatives to the above control examples, the timings may be adjusted to have the current pulse pairs to be generated at the same time Moreover, the second phase and the third phase may be replaced with each other. In the case of the number of phases of the stator windings 12 being greater than or equal to 4, current pulse pairs may be generated in, instead of (or in addition to) the second phase or the third phase, in other phases including the fourth phase. Consequently, with the current pulse pairs being generated at the same time, the magnetic field $\phi p$ is enhanced, thereby improving the torque $\tau$. As a result, it is possible to achieve the same operational effects as achievable according to the first to the fourth embodiments.

In the configuration example of the second embodiment shown in FIG. 20, the field circuit includes the single capacitive element C1; in the configuration example of the fourth embodiment shown in FIG. 27, the field circuit includes the two capacitive elements Ca1 and C1b. As alternatives to the above configuration examples, the field circuit may include three or more capacitive elements to the extent that they can be arranged in the rotor 20. Since only the number of the capacitive elements is different, it is still possible to achieve the same operational effects as achievable according to the second and fourth embodiments.

In the configuration example of the third embodiment shown in FIG. 24, the field winding 21 is provided as a single field winding. As an alternative, the field winding 21 may consist of two field windings 21a and 21b as in the configuration examples of the second embodiment shown in FIGS. 21 and 22. Moreover, as another alternative, the field winding 21 may consist of three field windings 21a, 21b and 21c as in the configuration examples of the fourth embodiment shown in FIGS. 28 and 29. That is, there may be provided one or more field windings to the extent that the one or more field windings can be wound on the main magnetic pole portions 22a. Since only the number of the field windings is different, it is still possible to achieve the same operational effects as achievable according to the second and fourth embodiments.

In the above-described embodiments, the rotor 20 is of a salient pole type having the plurality of main magnetic pole portions 22a provided in the rotor core 22. As an alternative, the rotor 20 may be of the Lundell type. In addition, though not shown in the figures, a Lundell type rotor includes a field winding 21, a cylindrical boss portion and a plurality of claw pole portions. The field winding 21 is wound on the boss portion. The claw pole portions circumferentially protrude at a predetermined pitch from respective axial ends of the boss portion. Moreover, the claw pole portions extend, toward the respective axial opponent's side, alternately in the circumferential direction. In the case of the rotor 20 being of the Lundell type, it is also possible to generate excitation magnetic flux in the stator windings 12, thereby exciting the field winding 21 with a significant difference provided by the second and third phases. Consequently, it is possible to excite, when performing rectangular-wave energization or overmodulation energization, the field winding 21 from the stator windings 12, thereby further improving the performance. Since only the structure of the rotor 20 is different, it is still possible to achieve the same operational effects as achievable according to the first to the fourth embodiments.

What is claimed is:

1. A field winding type rotating electric machine comprising:
   a stator having stator windings of three or more phases wound therein;
   a rotor including a rotor core with a field winding wound thereon, the rotor being rotatably arranged to face the stator;
   a rectifying element connected in series with the field winding to restrict field current flowing in the field winding to one direction, the field current being generated by exciting the field winding with magnetic fields that are created by supplying stator currents to flow in the stator windings;
   a driver including a plurality of switching elements and configured to output electric power of a plurality of phases to the stator windings; and
   a controller configured to output, to the driver, control signals of the plurality of phases for performing any of a sine-wave energization, rectangular-wave energization and overmodulation energization according to rotational speed of the rotor,
   wherein
   a power factor of the field winding type rotating electric machine is cos θ, and
   the controller is configured to generate, when performing the rectangular-wave energization or the overmodulation energization, a voltage pulse pair, which induces a current pulse pair, by:
   setting a reference time to a center of an ON duration or an OFF duration of the control signal of a first phase of the plurality of phases; and
   providing a temporary ON duration and a temporary OFF duration after a predetermined angle from the reference time, the predetermined angle being within a predetermined range including $\cos^{-1} \theta$ in electrical angle, the temporary ON duration being provided to temporarily turn ON the control signal of a second phase of the plurality of phases, which is different from the first phase, during an OFF duration of the control signal of the second phase, the temporary OFF duration being provided to temporarily turn OFF the control signal of a third phase of the plurality of phases, which is different from both the first and second phases, during an ON duration of the control signal of the third phase.

2. The field winding type rotating electric machine as set forth in claim 1, wherein a length of the temporary ON duration and a length of the temporary OFF duration are each set to be 0.5-10% of one cycle of the control signal of the first phase.

3. The field winding type rotating electric machine as set forth in claim 1, wherein the predetermined range is $\cos^{-1} \theta - 30° \leq \delta \leq \cos^{-1} \theta + 30°$.

4. The field winding type rotating electric machine as set forth in claim 1, wherein a start timing of one of the temporary ON duration and the temporary OFF duration is delayed by a delay period from a start timing of the other of the temporary ON duration and the temporary OFF duration.

5. The field winding type rotating electric machine as set forth in claim 1, wherein the controller is configured to generate, with respect to each phase, the pair of a positive voltage pulse and a negative voltage pulse once or twice during each cycle of electrical angle.

6. The field winding type rotating electric machine as set forth in claim 1, further comprising a capacitive element that has one end connected between two ends of the field winding and the other end connected to a terminal of the rectifying element.

7. The field winding type rotating electric machine as set forth in claim 1, wherein the rotor is one of a salient pole type rotor and a Lundell type rotor, the salient pole type rotor having the field winding concentratedly wound on each pole, the Lundell type rotor having a boss portion on which the field winding is wound, and a plurality of claw pole portions extending from corresponding ends of the boss portion, each of the claw pole portions forming an N pole or an S pole.

8. The field winding type rotating electric machine as set forth in claim 1, wherein the rotor includes main magnetic pole portions and auxiliary magnetic pole portions, the main magnetic pole portions being first convex portions of the rotor core which face the stator, the auxiliary magnetic pole portions being second convex portions of the rotor core which have a narrower circumferential width than the first convex portions, and
   the auxiliary magnetic pole portions have magnets provided therein, the magnets being magnetized in a direction canceling magnetic fields of the stator.

* * * * *